United States Patent
Jeon et al.

(10) Patent No.: US 12,231,939 B2
(45) Date of Patent: Feb. 18, 2025

(54) SENSING IN WIRELESS COMMUNICATIONS SYSTEM

(71) Applicant: Samsung Electronics Co., Ltd., Suwon-si (KR)

(72) Inventors: Jeongho Jeon, San Jose, CA (US); Ebrahim MolavianJazi, Santa Clara, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 17/644,050

(22) Filed: Dec. 13, 2021

(65) Prior Publication Data
US 2022/0256519 A1 Aug. 11, 2022

Related U.S. Application Data

(60) Provisional application No. 63/145,894, filed on Feb. 4, 2021.

(51) Int. Cl.
*G01S 7/02* (2006.01)
*G01S 13/02* (2006.01)
(Continued)

(52) U.S. Cl.
CPC .......... *H04W 24/10* (2013.01); *G01S 7/023* (2013.01); *G01S 13/02* (2013.01); *H04B 17/201* (2023.05);
(Continued)

(58) Field of Classification Search
CPC .......... G01S 3/00–86; G01S 7/00–64; G01S 13/00–958; H04B 7/02–12;
(Continued)

(56) References Cited

U.S. PATENT DOCUMENTS

2018/0059213 A1 3/2018 Wallstedt et al.
2019/0052450 A1 2/2019 Fodor et al.
(Continued)

FOREIGN PATENT DOCUMENTS

WO 2020057748 A1 3/2020
WO 2020216522 A1 10/2020

OTHER PUBLICATIONS

"3rd Generation Partnership Project; Technical Specification Group Radio Access Network; NR; Physical channels and modulation (Release 16)", 3GPP TS 38.211 v16.4.0, Dec. 2020, 133 pages.
(Continued)

*Primary Examiner* — Timothy J Weidner

(57) ABSTRACT

Resources are configured, by frame/subframe/slot/symbol, for uplink communication components, downlink communication components, radar sensing components, or flexible components. Flexible components are configured by symbol for uplink or downlink communications, radar sensing, or flexible usage. Full, partial or no overlap between resources for uplink, downlink or sidelink communication and resources for radar sensing may be configured. Frequency configuration for radar sensing may be in absolute units or grid units, and waveforms other than OFDM may be used for radar sensing. Configuration may be initiated by a base station in response to explicit or implicit request by a UE for sensing resources. A UE may sense resources within a configured resource pool for availability before using the resources for radar sensing.

17 Claims, 10 Drawing Sheets

(51) Int. Cl.
| | |
|---|---|
| *H04B 17/20* | (2015.01) |
| *H04B 17/24* | (2015.01) |
| *H04W 24/08* | (2009.01) |
| *H04W 24/10* | (2009.01) |
| *H04W 72/044* | (2023.01) |
| *H04W 72/0446* | (2023.01) |
| *H04W 72/0453* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ............ *H04B 17/24* (2015.01); *H04W 24/08* (2013.01); *H04W 72/044* (2013.01); *H04W 72/0446* (2013.01); *H04W 72/0453* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ......... H04B 17/0082–3913; H04L 5/0001–26; H04J 11/0023–0093; H04J 2011/0003–0096; H04W 4/30–80; H04W 8/18–245; H04W 16/02–32; H04W 24/02–10; H04W 36/0005–385; H04W 48/02–20; H04W 52/02–60; H04W 56/0005–0095; H04W 64/003–006; H04W 72/02–569; H04W 74/002–0891; H04W 84/02–16; H04W 88/02–12; H04W 92/02–24
See application file for complete search history.

(56) References Cited

U.S. PATENT DOCUMENTS

| | | | |
|---|---|---|---|
| 2019/0098626 | A1 | 3/2019 | Yi et al. |
| 2019/0293781 | A1* | 9/2019 | Bolin ..................... G01S 7/023 |
| 2020/0107249 | A1 | 4/2020 | Stauffer et al. |
| 2021/0014879 | A1 | 1/2021 | Bae et al. |
| 2022/0330324 | A1* | 10/2022 | Vejlgaard ............ H04W 74/008 |
| 2023/0076874 | A1* | 3/2023 | Jeon ..................... H04B 17/309 |

OTHER PUBLICATIONS

"3rd Generation Partnership Project; Technical Specification Group Radio Access Network; NR; Multiplexing and channel coding (Release 16)", 3GPP TS 38.212 v16.4.0, Dec. 2020, 152 pages.

"3rd Generation Partnership Project; Technical Specification Group Radio Access Network; NR; Physical layer procedures for control (Release 16)", 3GPP TS 38.213 v16.4.0, Dec. 2020, 181 pages.

"3rd Generation Partnership Project; Technical Specification Group Radio Access Network; NR; Physical layer procedures for data (Release 16)", 3GPP TS 38.214 v16.4.0, Dec. 2020, 169 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pages.

"3rd Generation Partnership Project; Technical Specification Group Radio Access Network; NR; Radio Resource Control (RRC) protocol specification (Release 16)", 3GPP TS 38.331 v16.3.0, Dec. 2020, 932 pages.

"3rd Generation Partnership Project; Technical Specification Group Radio Access Network; NR; NR and NG-RAN Overall Description; Stage 2 (Release 16)", 3GPP TS 38.300 v16.4.0, Dec. 2020, 149 pages.

International Search Report and Written Opinion issued May 3, 2022 regarding Application No. PCT/KR2022/001698, 11 pages.

Extended European Search Report issued Mar. 14, 2024 regarding Application No. 22750015.4, 9 pages.

Guo et al., "On the cross link interference of 5G with Flexible Duplex and Full Duplex", 2020 IEEE Wireless Communications and Networking Conference Workshops (WCNCW)m Apr. 2020, 4 pages.

* cited by examiner

SENSING IN WIRELESS COMMUNICATIONS SYSTEM

CROSS-REFERENCE TO RELATED APPLICATION AND CLAIM OF PRIORITY

This application claims priority to U.S. Provisional Patent Application No. 63/145,894 filed Feb. 4, 2021. The content of the above-identified patent document(s) is incorporated herein by reference.

TECHNICAL FIELD

The present disclosure relates generally to radar sensing in communications equipment, and more specifically to coexistence of radar sensing and wireless communications, potentially in overlapping frequency bands.

BACKGROUND

To meet the demand for wireless data traffic having increased since deployment of $4^{th}$ Generation (4G) or Long Term Evolution (LTE) communication systems and to enable various vertical applications, efforts have been made to develop and deploy an improved $5^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Resources are configured, by frame/subframe/slot/symbol, for uplink communication components, downlink communication components, radar sensing components, or flexible components. Flexible components are configured by symbol for uplink or downlink communications, radar sensing, or flexible usage. Full, partial or no overlap between resources for uplink, downlink or sidelink communication and resources for radar sensing may be configured. Frequency configuration for radar sensing may be in absolute units or grid units, and waveforms other than the waveform used for communication may be used for radar sensing. Configuration may be initiated by a base station in response to explicit or implicit request by a UE for sensing resources. A UE may sense resources within a configured resource pool for availability before using the resources for radar sensing.

In one embodiment, a base station includes a processor and a transceiver operatively coupled to the processor, where the transceiver is configured to indicate, to at least one user equipment (UE), a time pattern for a set of subcarriers and symbols, the time pattern including, optionally in units of time slots: one or more uplink components for uplink communications; one or more downlink components for downlink communications; one or more radar sensing components, and one or more flexible components that may be used for uplink or downlink communications or radar sensing. The flexible components may comprise a symbol pattern including: one or more uplink symbols for uplink communications; one or more downlink symbols for downlink communications; one or more radar sensing symbols; and one or more flexible symbols that may be used for uplink or downlink communications or radar sensing. The one or more radar sensing components may comprise frequencies different or wider than frequencies for communication, the frequency configuration for the one or more radar sensing components may be indicated in one of absolute units or units of a predefined frequency grid. Full, partial, or no overlap may exist of frequency resources allocated for the one or more radar sensing components overlaps with frequency resources allocated for the uplink components or the downlink components. A waveform other than the waveform used for communication may be employed for at least the one or more radar sensing components. The time pattern of resources may separate resources for uplink, downlink, or sidelink communications from resourced for radar sensing in at least one of a time domain and a frequency domain. The time pattern may be a configuration specific to the UE to avoid overlap of the one or more uplink components for uplink communications and the one or more downlink components for downlink communications with the one or more radar sensing components.

In a second embodiment, a method performed by a base station includes: determining a time pattern for a set of subcarriers and symbols, the time pattern including one or more uplink components for uplink communications, one or more downlink components for downlink communications, one or more radar sensing components, and one or more flexible components that may be used for uplink or downlink communications or radar sensing. The method also includes indicating the determined time pattern to at least one user equipment (UE). The one or more radar sensing components may comprise frequencies different or wider than frequencies for communication, the frequency configuration for the one or more radar sensing components may be indicated in one of absolute units or units of a predefined frequency grid. Full, partial, or no overlap may exist of frequency resources allocated for the one or more radar sensing components overlaps with frequency resources allocated for the uplink components or the downlink components. A waveform other than the waveform used for communication may be employed for at least the one or more radar sensing components. The time pattern of resources may separate resources for uplink, downlink, or sidelink communications from resourced for radar sensing in at least one of a time domain and a frequency domain. The time pattern may be a configuration specific to the UE to avoid overlap of the one or more uplink components for uplink communications and the one or more downlink components for downlink communications with the one or more radar sensing components.

In another embodiment, a user equipment includes a processor and a transceiver operatively coupled to the processor, the transceiver configured to indicate, to a base station, a request for allocation of radar sensing resources, wherein the indication of the request for allocation of radar sensing resources is one of: an explicit sensing request for one or more of a sensing time, a sensing frequency allocation, or a sensing sequence length; or an implicit sensing request indicated by one of a sensing activity state or a sensing category type linked to a configuration for sensing resources. The implicit sensing request may comprise one of: active radar sensing by the user equipment; inactive, idle or stand-by sensing by the user equipment; or execution by the user equipment of a sensing application having requirements for target sensing range, maximum sensing range, or minimum sensing range, target sensing resolution, maximum sensing resolution, or minimum sensing resolution, target sensing accuracy or maximum sensing accuracy, and/or target sensing transmission power. The indication of the request for allocation of radar sensing resources may be one of a physical random access channel (PRACH) transmission with a dedicated preamble, a PRACH transmission in a dedicated random access channel (RACH) occasion, a physical uplink control channel (PUCCH) transmission with an uplink control information (UCI) having a type corresponding to a sensing request, the UCI transmitted on a dynamic physical uplink shared channel (PUSCH), the UCI transmitted as a configured grant UCI (CG-UCI) on a configured grant PUSCH (CG-PUSCH), or a request field in a UCI corresponding to the sensing request. The transceiver may be configured to receive an indication specific to the user equipment of a configuration of a set of subcarriers and symbols allocated to one or more uplink components for uplink communications, one or more downlink components for downlink communications, and one or more radar sensing components.

In an embodiment, a user equipment includes a transceiver configured to receive an indication of a configuration a resource pool and a processor operatively coupled to the transceiver, where the processor is configured to process resources within the configured resource pool before performing radar sensing using the resources, and to initiate radar sensing using the resources only upon determining that the resources are available for radar sensing. Availability of resources from the configured resource pool may be determined based on one of energy detection or signal detection, where energy detection may include comparison of reference signal received power on the resources from the configured resource pool with a threshold and signal detection may include attempting to detect one of a signal, a channel, or a transmission block on the resources from the configured resource pool.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
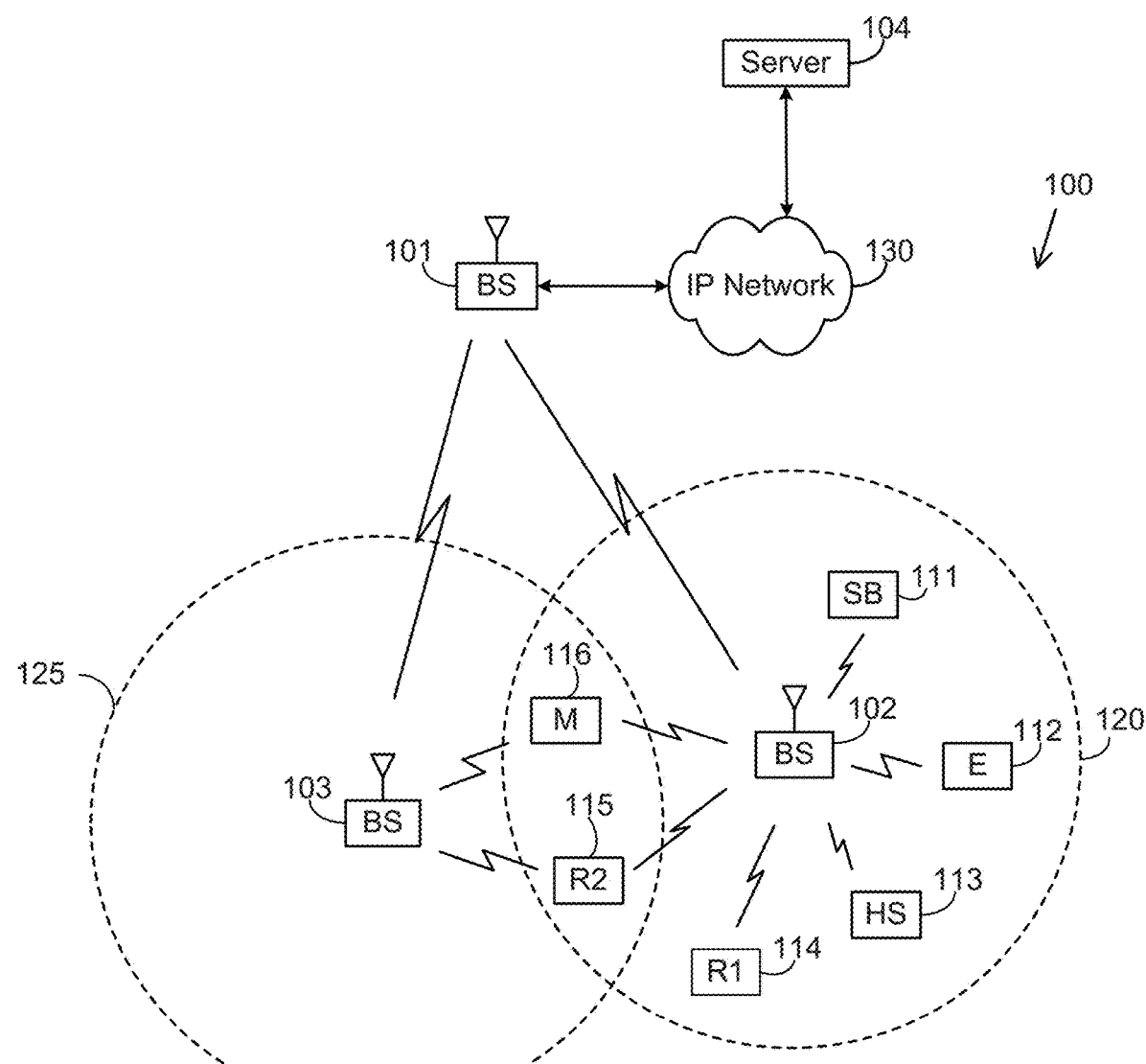
FIG. 1 illustrates an exemplary networked system utilizing communication and sensing according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

References

[1] 3GPP TS 38.211 Rel-16 v16.4.0, "NR; Physical channels and modulation," December 2020.
[2] 3GPP TS 38.212 Rel-16 v16.4.0, "NR; Multiplexing and channel coding," December 2020.
[3] 3GPP TS 38.213 Rel-16 v16.4.0, "NR; Physical layer procedures for control," December 2020.
[4] 3GPP TS 38.214 Rel-16 v16.4.0, "NR; Physical layer procedures for data," December 2020.
[5] 3GPP TS 38.321 Rel-16 v16.3.0, "NR; Medium Access Control (MAC) protocol specification," December 2020.
[6] 3GPP TS 38.331 Rel-16 v16.3.0, "NR; Radio Resource Control (RRC) protocol specification," December 2020.
[7] 3GPP TS 38.300 Rel-16 v16.4.0, "NR; NR and NG-RAN Overall Description; Stage 2," December 2020.

The above-identified references are incorporated herein by reference.

Abbreviations

3GPP Third Generation Partnership Project
ACK Acknowledgement
AP Antenna port
BCCH Broadcast control channel
BCH Broadcast channel
BD Blind decoding
BFR Beam failure recovery
BI Back-off indicator
BW Bandwidth
BLER Block error ratio
BL/CE Bandwidth limited, coverage enhanced
BWP Bandwidth part
CA Carrier aggregation
CB Contention based
CBG Code block group
CBRA Contention based random access
CBS PUR Contention based shared PUR
CCE Control channel element
CD-SSB Cell-defining SSB
CE Coverage enhancement
CFRA Contention free random access
CFS PUR Contention free shared PUR
CG Configured grant
CGI Cell global identifier
CI Cancellation indication
CORESET Control Resource Set
CP Cyclic prefix
C-RNTI Cell RNTI
CRB Common resource block
CR-ID Contention resolution identity
CRC Cyclic redundancy check
CSI Channel state information
CSI-RS Channel state information reference signal
CS-G-RNRI Configured scheduling group RNTI
CS-RNTI Configured scheduling RNTI
CSS Common search space
DAI Downlink assignment index
DCI Downlink control information
DFI Downlink feedback information
DL Downlink
DMRS/DM-RS Demodulation Reference Signal
DTE Downlink transmission entity
EIRP Effective isotropic radiated power
eMTC Enhanced machine type communication
EPRE Energy per resource element
FDD Frequency division duplexing
FDM Frequency division multiplexing
FDRA Frequency domain resource allocation
FR1 Frequency range 1
FR2 Frequency range 2
gNB gNodeB
GPS Global positioning system
HARQ Hybrid automatic repeat request
HARQ-ACK Hybrid automatic repeat request acknowledgement
HARQ-NACK Hybrid automatic repeat request negative acknowledgement
HPN HARQ process number
ID Identity/identifier
IE Information element
IIoT Industrial Internet of things
IoT Internet of Things
KPI Key performance indicator
LBT Listen before talk
LNA Low-noise amplifier
LRR Link recovery request
LSB Least significant bit
LTE Long Term Evolution
MAC Medium access control
MAC-CE MAC control element
MCG Master cell group MCS Modulation and coding scheme
MIB Master Information Block
MIMO Multiple input multiple output
MPE Maximum permissible exposure
MTC Machine type communication
mMTC Massive machine type communication
MSB Most significant bit
NACK Negative acknowledgment
NDI New data indicator
NPN Non-public network
NR New Radio
NR-L NR Light/NR Lite
NR-U NR unlicensed
NTN Non-terrestrial network
OSI Other system information
PA Power amplifier
PI Preemption indication
PBCH Physical broadcast channel
PCell Primary cell
PRACH Physical Random Access Channel
PDCCH Physical Downlink Control Channel
PDSCH Physical Downlink Shared Channel
PUCCH Physical Uplink Control Channel
PUSCH Physical Uplink Shared Channel
PMI Precoder matrix indicator
P-MPR Power Management Maximum Power Reduction
PO PUSCH occasion
PSCell Primary secondary cell
PSS Primary synchronization signal
P-RNTI Paging RNTI
PRG Precoding resource block group
PRS Positioning reference signal
PTRS Phase tracking reference signal
PUR Pre-configured uplink resource
QCL Quasi co-located/quasi co-location
RA Random access
RACH Random Access Channel
RAPID Random access preamble identity
RAR Random access response
RA-RNTI Random access RNTI
RAN Radio Access Network
RAT Radio access technology
RB Resource block
RBG Resource block group
RF Radio frequency
RLF Radio link failure
RLM Radio link monitoring
RMSI Remaining minimum system information
RNTI Radio Network Temporary Identifier
RO RACH occasion
RRC Radio Resource Control
RS Reference signal
RSRP Reference signal received power
RSRQ Reference signal received quality
RSSI Received signal strength indicator
RV Redundancy version
Rx Receive/receiving
SAR Specific absorption rate
SCG Secondary cell group
SFI Slot format indication
SFN System frame number
SI System Information
SI-RNTI System Information RNTI
SIB System Information Block
SINR Signal to Interference and Noise Ratio
SCS Sub-carrier spacing
SMPTx Simultaneous multi-panel transmission
SMPTRx Simultaneous multi-panel transmission and reception
SpCell Special cell
SPS Semi-persistent scheduling
SR Scheduling Request
SRI SRS resource indicator
SRS Sounding reference signal
SS Synchronization signal
SSB SS/PBCH block
SSS Secondary synchronization signal
STxMP Simultaneous transmission by multiple panels
STRxMP Simultaneous transmission and reception by multiple panels
TA Timing advance
TB Transport Block
TBS Transport Block size
TCI Transmission Configuration Indication
TC-RNTI Temporary cell RNTI
TDD Time division duplexing
TDM Time division multiplexing
TDRA Time domain resource allocation
TPC Transmit power control
TRP Total radiated power
Tx Transmit/transmitting
UCI Uplink Control Information
UE User equipment
UL Uplink
UL-SCH Uplink shared channel
URLLC Ultra reliable and low latency communication
UTE Uplink transmission entity
V2X Vehicle to anything
VoIP Voice over Internet Protocol (IP)
XR eXtended reality The present disclosure relates to beyond 5G or 6G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 6G, and so on), Institute of Electrical and Electronics Engineers (IEEE) standards (such as 802.11/15/16), and so forth.

This disclosure pertains joint communication and radar sensing, wherein a UE is able to perform downlink/uplink/sidelink communication and also perform radar sensing by "sensing"/detecting environmental objects and their physical characteristics such as location/range, velocity/speed, elevation, angle, and so on. Radar sensing is achieved by sending a suitable sounding waveform and receiving and analyzing reflections or echoes of the sounding waveform. Such radar sensing operation can be used for applications and use-case such as proximity sensing, liveness detection, gesture control, face recognition, room/environment sensing, motion/presence detection, depth sensing, and so on, for various UE form factors. For some larger UE form factors, such as (driver-less) vehicles, trains, drones and so on, radar sensing can be additionally used for speed/cruise control, lane/elevation change, rear/blind spot view, parking assistance, and so on. Such radar sensing operation can be performed in various frequency bands, including millimeter wave (mmWave)/Frequency Range 2 (FR2) bands. In addition, with Terahertz (THz) spectrum, ultra-high resolution sensing, such as sub-cm level resolution, and sensitive Doppler detection, such as micro-Doppler detection, can be achieved with very large bandwidth allocation, for example, on the order of several gigahertz (GHz) or more.

Current implementations can support individual operation of communication and sensing, wherein the UE is equipped with separate modules, in terms of baseband processing units and/or RF chain and antenna arrays, for communication procedures and radar procedures. The separate communication and sensing architecture requires repetitive implementation that increased UE complexity. In addition, since the two modules are designed separately, there is little/no coordination between the two modules, so time/frequency/sequence/spatial resources are not efficiently used by the two modules, which in some cases can even lead to (self-) interference between the two modules of a same UE. In addition, the radar sensing operation of the UE can be based on pure implementation based methods and without any unified standards support, which can cause (significant) inter-UE issues, or may not be fully compatible with cellular systems. Furthermore, separate design of the two modules makes it difficult to use measurement or information acquired by one module to assist the other module. For example, the communication module may be unaware of a potential beam blockage due to a nearby object, although the sensing module may have already detected the object.

There is a need to develop a unified standard for support of joint communication and sensing to reduce the UE implementation complexity and enable coexistence of the two modules. There is another need to ensure time/frequency/sequence/spatial resources are efficiently used across communication and sensing modules of a same UE, as well as among different UEs performing these two operations, to reduce/avoid (self-)interference. There is a further need to design the two operations in such a way that the two modules provide assistance to each other by exchanging measurement results and acquired information, so that both procedures can operate more robustly and effectively.

The present disclosure provides designs for the support of joint communication and radar sensing. The disclosure aims for optimal signal design and processing block architecture that can be reused for both communication and sensing. In addition, sensing operation can be integrated into the frame structure and bandwidth configuration. Furthermore, a unified design can achieve coordination between BS-UE for uninterrupted communication, and UE-UE to minimize the impact of interference due to sensing.

Several aspects and elements of an NR communication module can be re-used for radar operation, such as waveform transmission, resource/sequence allocation, and reception procedure. Therefore, it is possible to coherently re-use existing NR communication design, possibly with suitable modification, to perform radar operations tasks. It is expected that the overall UE complexity can be reasonably reduced based on such unified design, coexistence, and cooperation. Various techniques are provided for coordinated configuration of non-overlapping time/frequency/sequence/spatial resources to reduce/eliminate any intra-UE interference, and accommodate high quality (such as high-SINR) reception of channels and signals for both DL/UL/SL communications and radar sensing, which increases the performance for both operations. In addition, various coordination mechanisms between UE and gNB, as well as between (neighbor) UEs, are considered that can minimize inter-UE interference. Various design aspects are proposed for an NR-compatible radar sensing waveform with high radar detection performance. In particular, as an example, SRS or SL CSI-RS can be good candidates as a radar reference signal (RRS), wherein modifications to those reference signals are disclosed for improved radar performance, such as enhanced time patterns, improved frequency allocation, and flexible beam/spatial filter configuration. Moreover, several methods for radar sensing transmission power control are presented in line with NR power control framework and/or aligned with radar power equation. Finally, multiple approaches are described for exchange of assistance information between communication and radar sensing for more efficient communication operation, such as for beam management or CSI reporting, or for efficient radar sensing using legacy communication signals.

One motivation of this disclosure is to support radar sensing operation in beyond 5G or in 6G, especially in higher frequency bands such as the ones above 6 GHz, mmWave, and even Tera Hz (THz) bands. In addition, the embodiments can apply to various use cases and settings, such as frequency bands below 6 GHz, enhanced mobile broadband (eMBB), ultra-reliable low-latency communication (URLLC) and industrial Internet of Things (IIoT) and extended reality (XR), massive machine type communication (mMTC) and Internet of Things (IoT), sidelink/vehicle to everything (V2X), operation in unlicensed/shared spectrum (New Radio Unlicensed or "NR-U"), non-terrestrial networks (NTN), aerial systems such as drones, operation with reduced capability (RedCap) UEs, private or non-public networks (NPN), and so on.

Embodiments of the disclosure for supporting joint communication and radar sensing procedures are summarized in the following and are fully elaborated further below.

E-1) Resource allocation in time and frequency for communication and sensing: In one embodiment, the UE can be configured or indicated with various time/frequency resource allocation methods for communication and sensing.

E-2) UE signaling to request 5G/6G base station for activation and release of resources for sensing In one embodiment, a UE can request gNB, for the case of beyond 5G system as an example, for configuration of time/frequency resources for radar sensing, and/or for activation or release of such configured resources. One motivation for such signaling between UE and gNB is because radar sensing can be a UE-side operation, whose timing may be based per UE decision or need, and unknown to the gNB. With network control, the assignment of reference signals for radar can be made optimal to not increase significant interference to the system or neighboring UEs. The coordination on the time/frequency resource for radar can also help prevent interruption of communication.

A description of example embodiments is provided below.

The text and figures are provided solely as examples to aid the reader in understanding the disclosure. They are not intended and are not to be construed as limiting the scope of this disclosure in any manner. Although certain embodiments and examples have been provided, it will be apparent to those skilled in the art based on the disclosures herein that changes in the embodiments and examples shown may be made without departing from the scope of this disclosure.

Aspects, features, and advantages of the disclosure are readily apparent from the following detailed description, simply by illustrating a number of particular embodiments and implementations. The subject matter of the disclosure is also capable of other and different embodiments, and several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 2:
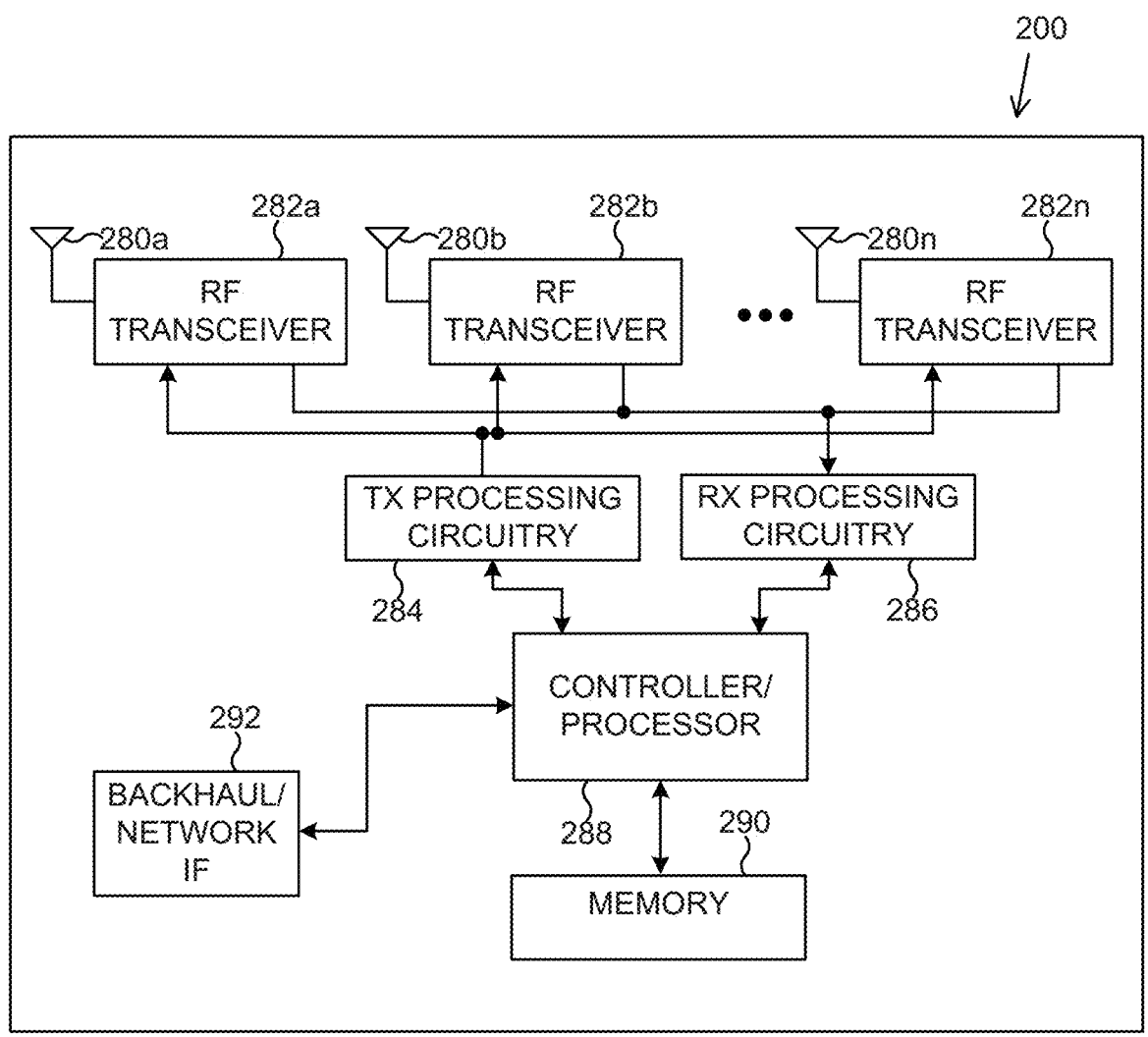
FIG. 2 illustrates an exemplary base station (BS) utilizing communication and sensing according to various embodiments of this disclosure.

Throughout this disclosure, all figures such as FIG. 1, FIG. 2, and so on, illustrate examples according to embodiments of the present disclosure. For each figure, the corresponding embodiment shown in the figure is for illustration only. One or more of the components illustrated in each figure can be implemented in specialized circuitry configured to perform the noted functions or one or more of the components can be implemented by one or more processors executing instructions to perform the noted functions. Other embodiments could be used without departing from the scope of the present disclosure. In addition, the descriptions of the figures are not meant to imply physical or architectural limitations to the manner in which different embodiments may be implemented. Different embodiments of the present disclosure may be implemented in any suitably-arranged communications system.

The below flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Throughput the present disclosure, the term "gNB" is used to refer to a cellular base station, such as a 5G/6G base station (possibly referred to as 'gNB' or any other terminology) or, in general, a network node or access point of a wireless system.

Throughput the present disclosure, the terms "SSB" and "SS/PBCH block" are used interchangeably.

Throughout the present disclosure, the term "configuration" and variations thereof (such as "configured" and so on) are used to refer to one or more of: a system information signaling such as by a MIB or a SIB, a common higher layer/RRC signaling, and a dedicated higher layer/RRC signaling.

Throughput the present disclosure, the term "higher layer configuration" are used to refer to one or more of system information (such as SIB1), or common/cell-specific RRC configuration, or dedicated/UE-specific RRC configuration, or modifications or extensions or combinations thereof.

Throughput the present disclosure, the term signal quality is used to refer to, e.g., RSRP or RSRQ or RSSI or SINR, with or without filtering such as L1 or L3 filtering, of a channel or a signal such as a reference signal (RS) including SSB, CSI-RS, or SRS.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL Type A, Type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location (QCL) relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to [N] (e.g., N=8) TCI states to the codepoints of the DCI field 'Transmission Configuration Indication'. When the HARQ-ACK corresponding to the PDSCH carrying the activation command is transmitted in slot n, the indicated mapping between TCI states and codepoints of the DCI field 'Transmission Configuration Indication' should be applied after a MAC-CE application time, e.g., starting from the first slot that is after slot, e.g., $n+3N_{slot}^{subframe,\mu}$.

Various link adaptation types are supported including:
Adaptive transmission bandwidth;
Adaptive transmission duration;
Transmission power control;
Adaptive modulation and channel coding rate.

For channel state estimation purposes, the UE may be configured to transmit SRS that the gNB may use to estimate the uplink channel state and use the estimate in link adaptation.

The periodic, semi-persistent and aperiodic transmission of SRS is defined for gNB UL RTOA, UL SRS-RSRP, UL-AoA measurements to facilitate support of UL TDOA and UL AoA positioning methods as described in TS 38.305.

The periodic, semi-persistent and aperiodic transmission of SRS for positioning is defined for gNB UL relative time of arrival (RTOA), UL SRS-RSRP, UL-angle of arrival (AoA), gNB receive-transmit (Rx-Tx) time difference measurements to facilitate support of UL time difference of arrival (TDOA), UL AoA and multi-roundtrip time (RTT) positioning methods as described in TS 38.305.

The DL positioning reference signals (DL PRS) are defined to facilitate support of different positioning methods such as DL-TDOA, DL-AoD, multi-RTT through the following set of UE measurements DL reference signal time difference (RSTD), DL PRS-RSRP, and UE Rx-Tx time difference respectively as described in TS 38.305.

Besides DL PRS signals, UE can use SSB and CSI-RS for RRM (RSRP and RSRQ) measurements for enhanced cell identifier (E-CID) type of positioning.

The atmospheric ducting phenomenon, caused by lower densities at higher altitudes in the Earth's atmosphere, causes a reduced refractive index, causing the signals to bend back towards the Earth. A signal trapped in the atmospheric duct can reach distances far greater than normal. In TDD networks with the same UL/DL slot configuration, and in the absence of atmospheric ducting, a guard period is used to avoid the interference between UL and DL transmissions in different cells. However, when the atmospheric ducting phenomenon happens, radio signals can travel a relatively long distance, and the propagation delay exceeds the guard period. Consequently, the DL signals of an aggressor cell can interfere with the UL signals of a victim cell that is far away from the aggressor. Such interference is termed as remote interference. The further the aggressor is from the victim, the more UL symbols of the victim will be impacted.

A remote interference scenario may involve a number of victim and aggressor cells, where the gNBs execute remote interference management (RIM) coordination on behalf of their respective cells. Aggressor and victim gNBs can be grouped into semi-static sets, where each cell is assigned a set ID, and is configured with a RIM Reference Signal (RIM-RS) and the radio resources associated with the set ID. Each aggressor gNB can be configured with multiple set IDs and each victim gNB can be configured with multiple set IDs, whereas each cell can have at most one victim set ID and one aggressor set ID. Consequently, each gNB can be an aggressor and a victim at the same time.

To mitigate remote interference, the network enables RIM frameworks for coordination between victim and aggressor gNBs. The coordination communication in RIM frameworks can be wireless- or backhaul-based. The backhaul-based RIM framework uses a combination of wireless and backhaul communication, while in the wireless framework, the communication is purely wireless.

In both frameworks, all gNBs in a victim set simultaneously transmit an identical RIM reference signal carrying the victim set ID over the air.

In the wireless framework, upon reception of the RIM reference signal from the victim set, aggressor gNBs undertake RIM measures, and send back a RIM reference signal carrying the aggressor set ID. The RIM reference signal sent by the aggressor is able to provide information whether the atmospheric ducting phenomenon exists. The victim gNBs realize the atmospheric ducting phenomenon have ceased upon not receiving any reference signal sent from aggressors.

In the RIM backhaul framework, upon reception of the RIM reference signal from the victim set, aggressor gNBs undertake RIM measures, and establish backhaul coordination towards the victim gNB set. The backhaul messages are sent from individual aggressor gNBs to individual victim gNB, where the signaling is transparent to the core network. The RIM backhaul messages from aggressor to victim gNBs carry the indication about the detection or disappearance of RIM reference signal. Based on the indication from the backhaul message, the victim gNBs realize whether the atmospheric ducting and the consequent remote interference have ceased.

In both frameworks, upon realizing that the atmospheric ducting has disappeared, the victim gNBs stop transmitting the RIM reference signal.

When different TDD DL/UL patterns are used between neighboring cells, UL transmission in one cell may interfere with DL reception in another cell: this is referred to as Cross Link Interference (CLI).

To mitigate CLI, gNBs can exchange and coordinate their intended TDD DL-UL configurations over Xn and F1 interfaces; and the victim UEs can be configured to perform CLI measurements. There are two types of CLI measurements:
 SRS-RSRP measurement in which the UE measures SRS-RSRP over SRS resources of aggressor UE(s);
 CLI-RSSI measurement in which the UE measures the total received power observed over RSSI resources.
Layer 3 filtering applies to CLI measurement results and both event triggered and periodic reporting are supported.

Sidelink supports UE-to-UE direct communication using the sidelink resource allocation modes, physical-layer signals/channels, and physical layer procedures below.

Two sidelink resource allocation modes are supported: mode 1 and mode 2. In mode 1, the sidelink resource allocation is provided by the network. In mode 2, UE decides the SL transmission resources in the resource pool(s).

Physical sidelink control channel (PSCCH) indicates resource and other transmission parameters used by a UE for PSSCH. PSCCH transmission is associated with a DM-RS.

Physical sidelink shared channel (PSSCH) transmits the TBs of data themselves, and control information for HARQ procedures and CSI feedback triggers, etc. At least 6 OFDM symbols within a slot are used for PSSCH transmission. PSSCH transmission is associated with a DM-RS and may be associated with a phase tracking reference signal (PT-RS).

Physical sidelink feedback channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The sidelink synchronization signal consists of sidelink primary and sidelink secondary synchronization signals (S-PSS, S-SSS, respectively), each occupying 2 symbols and 127 subcarriers. Physical sidelink broadcast channel (PSBCH) occupies 9 and 5 symbols for normal and extended cyclic prefix cases respectively, including the associated DM-RS.

Sidelink HARQ feedback uses PSFCH and can be operated in one of two options. In one option, which can be configured for unicast and groupcast, PSFCH transmits either ACK or NACK using a resource dedicated to a single PSFCH transmitting UE. In another option, which can be configured for groupcast, PSFCH transmits NACK, or no PSFCH signal is transmitted, on a resource that can be shared by multiple PSFCH transmitting UEs.

In sidelink resource allocation mode 1, a UE which received PSFCH can report sidelink HARQ feedback to gNB via PUCCH or PUSCH.

For in-coverage operation, the power spectral density of the sidelink transmissions can be adjusted based on the pathloss from the gNB.

For unicast, the power spectral density of some sidelink transmissions can be adjusted based on the pathloss between the two communicating UEs.

For unicast, channel state information reference signal (CSI-RS) is supported for CSI measurement and reporting in sidelink. A CSI report is carried in a sidelink medium access control element (MAC CE).

For measurement on the sidelink, the following UE measurement quantities are supported:
  PSBCH reference signal received power (PSBCH RSRP);
  PSSCH reference signal received power (PSSCH-RSRP);
  PSCCH reference signal received power (PSCCH-RSRP);
  Sidelink received signal strength indicator (SL RSSI);
  Sidelink channel occupancy ratio (SL CR);
  Sidelink channel busy ratio (SL CBR).

A sounding reference signal (SRS) is generated based on Zadoff-Chu (ZC) sequence, which has a constant amplitude in time and frequency domain, and also has zero cyclic autocorrelation for any non-zero cyclic shift.

The UE may be configured with one or more Sounding Reference Signal (SRS) resource sets as configured by the higher layer parameter SRS-ResourceSet or SRS-PosResourceSet. For each SRS resource set configured by SRS-ResourceSet, a UE may be configured with K≥1 SRS resources (higher layer parameter SRS-Resource), where the maximum value of K is indicated by UE capability. When SRS is configured with the higher layer parameter SRS-PosResourceSet, a UE may be configured with SRS resources (higher layer parameter SRS-PosResource), where the maximum value of K is 16. The SRS resource set applicability is configured by the higher layer parameter usage in SRS-ResourceSet. When the higher layer parameter usage is set to 'beamManagement', only one SRS resource in each of multiple SRS sets may be transmitted at a given time instant, but the SRS resources in different SRS resource sets with the same time domain behavior in the same BWP may be transmitted simultaneously.

For aperiodic SRS at least one state of the DCI field is used to select at least one out of the configured SRS resource set(s).

The following SRS parameters are semi-statically configurable by higher layer parameter SRS-Resource or SRS-PosResource.
  srs-ResourceId or SRS-PosResourceId determines SRS resource configuration identity.
  Number of SRS ports as defined by the higher layer parameter nrofSRS-Ports. If not configured, nrofSRS-Ports is 1.
  Time domain behavior of SRS resource configuration as indicated by the higher layer parameter resourceType, which may be periodic, semi-persistent, aperiodic SRS transmission.
  Slot level periodicity and slot level offset as defined by the higher layer parameters periodicityAndOffset-p or periodicityAndOffset-sp for an SRS resource of type periodic or semi-persistent, which is configured by SRS-Resource, and periodicityAndOffset-p or periodicityAndOffset-sp for an SRS resource of type periodic or semi-persistent, which is configured by SRS-PosResource. The UE is not expected to be configured with SRS resources in the same SRS resource set SRS-ResourceSet or SRS-PosResourceSet with different slot level periodicities. For an SRS-ResourceSet configured with higher layer parameter resourceType set to 'aperiodic', a slot level offset is defined by the higher layer parameter slotOffset. For an SRS-PosResourceSet configured with higher layer parameter resourceType-r16 set to 'aperiodic-r16', the slot level offset is defined by the higher layer parameter slotOffset-r16 for each SRS resource.
  Number of OFDM symbols in the SRS resource, starting OFDM symbol of the SRS resource within a slot including repetition factor R as defined by the higher layer parameter resourceMapping or resourceMapping-r16. If R is not configured, then R is equal to the number of OFDM symbols in the SRS resource.
  SRS bandwidth $B_{SRS}$ and $C_{SRS}$, as defined by the higher layer parameter freqHopping or freqHopping-r16. If not configured, then $B_{SRS}=0$.
  Frequency hopping bandwidth, $b_{hop}$, as defined by the higher layer parameter freqHopping or freqHopping-r16. If not configured, then $b_{hop}=0$.
  Defining frequency domain position and configurable shift, as defined by the higher layer parameters freqDomainPosition and freqDomainShift or freqDomainShift-r16, respectively. If freqDomainPosition is not configured, freqDomainPosition is zero.
  Cyclic shift, as defined by the higher layer parameter cyclicShift-n2 or cyclicShift-n4 for transmission comb value 2 or 4 for an SRS configured by SRS-Resource respectively, and defined by the higher layer parameter cyclicShift-n2-r16, cyclicShift-n4-r16, or cyclicShift-n8-r16 for transmission comb value 2, 4 or 8 for an SRS configured by SRS-PosResource, respectively.
  Transmission comb value as defined by the higher layer parameter transmissionComb.
  Transmission comb offset as defined by the higher layer parameter combOffset-n2 or combOffset-n4 for transmission comb value 2 or 4 for an SRS configured by SRS-Resource respectively, and defined by the higher layer parameter combOffset-n2-r16, combOffset-n4-r16, or combOffset-n8-r16 for transmission comb value 2, 4, or 8 for an SRS configured by SRS-PosResource, respectively.
  SRS sequence ID as defined by the higher layer parameter sequenceId or sequenceId-r16.
  The configuration of the spatial relation between a reference RS and the target SRS, where the higher layer parameter spatialRelationInfo or spatialRelationInfo-Pos, if configured, contains the ID of the reference RS. The reference RS may be an SS/PBCH block, CSI-RS configured on serving cell indicated by higher layer parameter servingCellId if present, same serving cell as the target SRS otherwise, or an SRS configured on uplink BWP indicated by the higher layer parameter uplinkBWP or uplinkBWP-r16, and serving cell indicated by the higher layer parameter servingCellId if present, same serving cell as the target SRS otherwise. When the target SRS is configured by the higher layer parameter SRS-PosResourceSet, the reference RS may also be a DL PRS configured on a serving cell or a non-serving cell indicated by the higher layer parameter dl-PRS, or an SS/PBCH block of a non-serving cell indicated by the higher layer parameter ssb-Ncell.

The UE may be configured by the higher layer parameter resourceMapping in SRS-Resource with an SRS resource occupying $N_s \in \{1,2,4\}$ adjacent OFDM symbols within the last 6 symbols of the slot, or at any symbol location within the slot if resourceMapping-r16 is provided subject to UE capability, where all antenna ports of the SRS resources are mapped to each symbol of the resource. When the SRS is configured with the higher layer parameter SRS-PosResourceSet the higher layer parameter resourceMapping in SRS-PosResource with an SRS resource occupying $N_s \in \{1, 2,4,8,12\}$ adjacent symbols anywhere within the slot.

If a PUSCH with a priority index 0 and SRS configured by SRS-Resource are transmitted in the same slot on a serving cell, the UE may only be configured to transmit SRS after the transmission of the PUSCH and the corresponding DM-RS.

If a PUSCH transmission with a priority index 1 or a PUCCH transmission with a priority index 1 would overlap in time with an SRS transmission on a serving cell, the UE does not transmit the SRS in the overlapping symbol(s).

The UE is not expected to be configured with different time domain behavior for SRS resources in the same SRS resource set. The UE is also not expected to be configured with different time domain behavior between SRS resource and associated SRS resources set.

For operation in the same carrier, the UE is not expected to be configured on overlapping symbols with an SRS resource configured by the higher layer parameter SRS-PosResource and an SRS resource configured by the higher layer parameter SRS-Resource with resourceType of both SRS resources as 'periodic'.

For operation in the same carrier, the UE is not expected to be triggered to transmit SRS on overlapping symbols with an SRS resource configured by the higher layer parameter SRS-PosResource and an SRS resource configured by the higher layer parameter SRS-Resource with resourceType of both SRS resources as 'semi-persistent' or 'aperiodic'.

For operations in the same carrier, the UE is not expected to be configured on overlapping symbols with more than one SRS resources configured by the higher layer parameter SRS-PosResource with resourceType of the SRS resources as 'periodic'.

For operations in the same carrier, the UE is not expected to be triggered to transmit SRS on overlapping symbols with more than one SRS resources configured by the higher layer parameter SRS-PosResource with resourceType of the SRS resources as 'semi-persistent' or 'aperiodic'.

For intra-band and inter-band carrier aggregation (CA) operations, a UE can simultaneously transmit more than one SRS resource configured by SRS-PosResource on different component carriers (CCs), subject to UE's capability For intra-band and inter-band CA operations, a UE can simultaneously transmit more than one SRS resource configured by SRS-PosResource and SRS-Resource on different CCs, subject to UE's capability.

The SRS request field in DCI format 0 1, 1 1, 0 2 (if SRS request field is present), 1 2 (if SRS request field is present) indicates a triggered SRS resource set. The 2-bit SRS request field in DCI format 2 3 indicates a triggered SRS resource set if the UE is configured with higher layer parameter srs-TPC-PDCCH-Group set to 'typeB', or indicates the SRS transmission on a set of serving cells configured by higher layers if the UE is configured with higher layer parameter srs-TPC-PDCCH-Group set to 'typeA'.

When the higher layer parameter enableDefaultBeamPLForSRS is set 'enabled', and if the higher layer parameter spatialRelationInfo for the SRS resource, except for the SRS resource with the higher layer parameter usage in SRS-ResourceSet set to 'beamManagement' or for the SRS resource with the higher layer parameter usage in SRS-ResourceSet set to 'nonCodebook' with configuration of associatedCSI-RS or for the SRS resource configured by the higher layer parameter SRS-PosResourceSet, is not configured in FR2 and if the UE is not configured with higher layer parameter(s) pathlossReferenceRS, and if the UE is not configured with different values of coresetPoolIndex in ControlResourceSets, and is not provided at least one TCI codepoint mapped with two TCI states, the UE shall transmit the target SRS resource in an active UL BWP of a CC, according to the spatial relation, if applicable, with a reference to the RS configured with qcl-Type set to 'typeD' corresponding to the QCL assumption of the CORESET with the lowest controlResourceSetId in the active DL BWP in the CC.

according to the spatial relation, if applicable, with a reference to the RS configured with qcl-Type set to 'typeD' in the activated TCI state with the lowest ID applicable to PDSCH in the active DL BWP of the CC if the UE is not configured with any CORESET in the active DL BWP of the CC When the SRS is configured by the higher layer parameter SRS-PosResource and if the higher layer parameter spatialRelationInfoPos is configured, the SRS contains the ID of the configuration fields of a reference RS. The reference RS can be an SRS configured by the higher layer parameter SRS-Resource or SRS-PosResource, CSI-RS, SS/PBCH block, or a DL PRS configured on a serving cell or a SS/PBCH block or a DL PRS configured on a non-serving cell.

The UE is not expected to transmit multiple SRS resources with different spatial relations in the same OFDM symbol.

If the UE is not configured with the higher layer parameter spatialRelationInfoPos the UE may use a fixed spatial domain transmission filter for transmissions of the SRS configured by the higher layer parameter SRS-PosResource across multiple SRS resources or it may use a different spatial domain transmission filter across multiple SRS resources.

The UE is only expected to transmit an SRS configured the by the higher layer parameter SRS-PosResource within the active UL BWP of the UE.

When the configuration of SRS is done by the higher layer parameter SRS-PosResource, the UE can only be provided with a single RS source in spatialRelationInfoPos per SRS resource for positioning.

For operation on the same carrier, if an SRS configured by the higher parameter SRS-PosResource collides with a scheduled PUSCH, the SRS is dropped in the symbols where the collision occurs.

The UE does not expect to be configured with SRS-PosResource on a BWP not configured with PUSCH/PUCCH transmission.

An SRS resource set can be configured with a parameter "usage" that can take a value of 'code-book-based', 'non-code-book-based', 'beam management', or 'antenna switching'.

If a UE transmits SRS based on a configuration by SRS-ResourceSet on active UL BWP b of carrier f of serving cell c using SRS power control adjustment state with index 1, the UE determines the SRS transmission power $P_{SRS,b,f,c}(i, q_s, l)$ in SRS transmission occasion i as $$P_{SRS,b,f,c}(i, q_s, l) =$$

$$\min \begin{cases} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{cases} [dBm]$$

where
- $P_{CMAX,f,c}(i)$ is the UE configured maximum output power defined in [TS 38.101-1], [TS38.101-2] and [TS 38.101-3] for carrier f of serving cell c in SRS transmission occasion i
- $P_{O\_SRS,b,f,c}(q_s)$ is provided by p0 for active UL BWP b of carrier f of serving cell c and SRS resource set $q_s$ provided by SRS-ResourceSet and SRS-ResourceSetId
- $M_{SRS,b,f,c}(i)$ is a SRS bandwidth expressed in number of resource blocks for SRS transmission occasion i on active UL BWP b of carrier f of serving cell c and μ is a SCS configuration defined in [TS 38.211]
- $\alpha_{SRS,b,f,c}(q_s)$ is provided by alpha for active UL BWP b of carrier f of serving cell c and SRS resource set $q_s$
- $PL_{b,f,c}(q_d)$ is a downlink pathloss estimate in dB calculated by the UE using RS resource index $q_d$ for the active DL BWP of serving cell c and SRS resource set $q_s$ [TS 38.214]. The RS resource index $q_d$ is provided by pathlossReferenceRS associated with the SRS resource set $q_s$ and is either an ssb-Index providing a SS/PBCH block index or a csi-RS-Index providing a CSI-RS resource index. If the UE is provided enablePL-RS-UpdateForPUSCH-SRS, a MAC CE [TS 38.321] can provide by SRS-PathlossReferenceRS-Id a corresponding RS resource index $q_d$ for aperiodic or semi-persistent SRS resource set $q_s$
  - If the UE is not provided pathlossReferenceRS or SRS-PathlossReferenceRS-Id, or before the UE is provided dedicated higher layer parameters, the UE calculates $PL_{b,f,c}(q_d)$ using a RS resource obtained from an SS/PBCH block with same SS/PBCH block index as the one the UE uses to obtain MIB
  - If the UE is provided pathlossReferenceLinking, the RS resource is on a serving cell indicated by a value of pathlossReferenceLinking
  - If the UE
    - is not provided pathlossReferenceRS or SRS-PathlossReferenceRS-Id,
    - is not provided spatialRelationInfo, and
    - is provided enableDefaultBeamPL-ForSRS, and
    - is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states [TS 38.212]
    the UE determines a RS resource index $q_d$ providing a periodic RS resource configured with qcl-Type set to 'typeD' in
    - the TCI state or the QCL assumption of a CORESET with the lowest index in the active DL BWP, if CORESETs are provided in the active DL BWP of serving cell c
    - the active PDSCH TCI state with lowest ID [TS 38.214] in the active DL BWP, if CORESETs are not provided in the active DL BWP of serving cell c For the SRS power control adjustment state for active UL BWP b of carrier f of serving cell c and SRS transmission occasion i
- $h_{b,f,c}(i,l) = f_{b,f,c}(i,l)$, where $f_{b,f,c}(i,l)$ is the current PUSCH power control adjustment state, if srs-PowerControlAdjustmentStates indicates a same power control adjustment state for SRS transmissions and PUSCH transmissions; or
- $h_{b,f,c}(i) = h_{b,f,c}(i-i_0) + \sum_{m=0}^{C(S_i)-1} \delta_{SRS,b,f,c}(m)$ if the UE is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where
  - The $\delta_{SRS,b,f,c}$ values are given in Table 1
  - $\delta_{SRS,b,f,c}(m)$ is jointly coded with other TPC commands in a PDCCH with DCI format 2_3
  - $\sum_{m=0}^{C(S_i)-1} \delta_{SRS,b,f,c}(m)$ is a sum of TPC command values in a set $S_i$ of TPC command values with cardinality $C(S_i)$ that the UE receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0 > 0$ is the smallest integer for which $K_{SRS}(i-i_0)$ symbols before SRS transmission occasion $i-i_0$ is earlier than $K_{SRS}(i)$ symbols before SRS transmission occasion i
  - if the SRS transmission is aperiodic, $K_{SRS}(i)$ is a number of symbols for active UL BWP b of carrier f of serving cell c after a last symbol of a corresponding PDCCH triggering the SRS transmission and before a first symbol of the SRS transmission
  - if the SRS transmission is semi-persistent or periodic, $K_{SRS}(i)$ is a number of $K_{SRS,min}$ symbols equal to the product of a number of symbols per slot, $N_{symb}^{slot}$, and the minimum of the values provided by k2 in PUSCH-ConfigCommon for active UL BWP b of carrier f of serving cell c
  - If the UE has reached maximum power for active UL BWP b of carrier f of serving cell c at SRS transmission occasion $i-i_0$ and $\sum_{m=0}^{C(S_i)-1} \delta_{SRS,b,f,c}(m) \geq 0$, then $h_{b,f,c}(i) = h_{b,f,c}(i-i_0)$
  - If UE has reached minimum power for active UL BWP b of carrier f of serving cell c at SRS transmission occasion $i-i_0$ and $\sum_{m=0}^{C(S_i)-1} \delta_{SRS,b,f,c}(m) \leq 0$, then $h_{b,f,c}(i) = h_{b,f,c}(i-i_0)$
  - If a configuration for a $P_{O\_SRS, b, f, c}(q_s)$ value or for a $\alpha_{SRS, b, f, c}(q_s)$ value for a corresponding SRS power control adjustment state l for active UL BWP b of carrier f of serving cell c is provided by higher layers $$h_{b,f,c}(k)=0, k=0,1,\ldots,i$$

Else $$h_{b,f,c}(0) = \Delta P_{rampup,b,f,c} + \delta_{msg2,b,f,c}$$

where
- $\delta_{msg2,b,f,c}$ is the TPC command value indicated in the random access response grant corresponding to the random access preamble that the UE transmitted on active UL BWP b of carrier f of the serving cell c, and $$\Delta P_{rampup,b,f,c} =$$

$$\min \left[ \begin{array}{l} \max \left( \begin{array}{l} 0, \\ P_{CMAX,f,c} - (P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d)) \end{array} \right), \\ \Delta P_{rampuprequested,b,f,c} \end{array} \right];$$

where $\Delta P_{rampuprequested,\ b,\ f,\ c}$ is provided by higher layers and corresponds to the total power ramp-up requested by higher layers from the first to the last preamble for active UL BWP b of carrier f of serving cell c.

$h_{b,f,c} = \delta_{SRS,b,f,c}(i)$ if the UE is not configured for PUSCH transmissions on active UL BWP b of carrier f of serving cell c, or if srs-PowerControlAdjustmentStates indicates separate power control adjustment states between SRS transmissions and PUSCH transmissions, and tpc-Accumulation is provided, and the UE detects a DCI format 2_3 $K_{SRS,\ min}$ symbols before a first symbol of SRS transmission occasion i, where absolute values of $\delta_{SRS,\ b,\ f,\ c}$ are provided in Table 1 if srs-PowerControlAdjustmentStates indicates a same power control adjustment state for SRS transmissions and PUSCH transmissions, the update of the power control adjustment state for SRS transmission occasion i occurs at the beginning of each SRS resource in the SRS resource set $q_s$; otherwise, the update of the power control adjustment state SRS transmission occasion i occurs at the beginning of the first transmitted SRS resource in the SRS resource set $q_s$.

If a UE transmits SRS based on a configuration by SRS-PosResourceSet on active UL BWP b of carrier f of serving cell c, the UE determines the SRS transmission power $P_{SRS,b,f,c}(i, q_s)$ in SRS transmission occasion i as $$P_{SRS,b,f,c}(i, q_s) = \min \left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) \end{array} \right\} [dBm]$$

where, $P_{O\_SRS,b,f,c}(q_s)$ and $\alpha_{SRS,b,f,c}(q_s)$ are provided by p0-r16 and alpha-r16 respectively, for active UL BWP b of carrier f of serving cell c, and SRS resource set $q_s$ is indicated by SRS-PosResourceSetId from SRS-PosResourceSet, and $PL_{b,f,c}(q_d)$ is a downlink pathloss estimate in dB calculated by the UE, in case of an active DL BWP of a serving cell c, using RS resource indexed $q_d$ in a serving or non-serving cell for SRS resource set $q_s$ [TS 38.214]. A configuration for RS resource index $q_d$ associated with SRS resource set $q_s$ is provided by pathlossReferenceRS-Pos if a ssb-IndexNcell is provided, referenceSignalPower is provided by ss-PBCH-BlockPower-r16 if a dl-PRS-ResourceId is provided, referenceSignalPower is provided by dl-PRS-ResourcePower If the UE determines that the UE is not able to accurately measure $PL_{b,f,c}(q_d)$, or the UE is not provided with pathlossReferenceRS-Pos, the UE calculates $PL_{b,f,c}(q_d)$ using a RS resource obtained from the SS/PBCH block of the serving cell that the UE uses to obtain MIB The UE may indicate a capability for a number of pathloss estimates that the UE can simultaneously maintain for all SRS resource sets provided by SRS-PosResourceSet in addition to the up to four pathloss estimates that the UE maintains per serving cell for PUSCH/PUCCH transmissions and for SRS transmissions configured by SRS-Resource.

TABLE 1

Mapping of TPC Command Field in DCI format 2_3 to absolute and accumulated $\delta_{SRS,\ b,\ f,\ c}$ values

| TPC Command Field | Accumulated $\delta_{SRS,\ b,\ f,\ c}$ [dB] | Absolute $\delta_{SRS,\ b,\ f,\ c}$ [dB] |
|---|---|---|
| 0 | −1 | −4 |
| 1 | 0 | −1 |
| 2 | 1 | 1 |
| 3 | 3 | 4 |

In particular, a pathloss (PL) reference for SRS transmission can be an SSB or a periodic CSI-RS from the serving cell. For an SRS for positioning, a PL reference can be additionally a neighbor cell SSB or a DL positioning reference signal (DL PRS).

Radar (originally an acronym for "RAdio Detection And Ranging") is a system based on electromagnetic waveforms for detection of objects and determination of their physical characteristics such as location/range, velocity/speed, angle, elevation, and so on. Basically, a radio wave as a sounding waveform is transmitted by a radar Tx antenna, hits the object, and reflections of the wave return from the object to the radar. The radar Rx antenna receives the reflections, which are then analyzed by a data processor to determine the target object's physical characteristics.

Radars usually operate with waveform reflection with (very) low received power levels. Therefore, a key parameter for radar performance is the transmitted and received power levels with which the radar can achieve desired detection performance. The radar received power is usually captured by the following formulas, known as the "radar equation":

$$P_r = \frac{P_t G_t G_r \sigma c^2}{(4\pi)^3 f^2 R^4},$$

where $P_t$ is the transmit power, $P_r$ is the received power, $G_t$ is the Tx antenna gain, $G_r$ is the Rx antenna gain, a with the units of square meters (m$^2$) is the radar cross section (RCS) that captures the target's scattering characteristics, c is the speed of light, f is the carrier frequency for the radar sounding waveform, and R is the target's range (relative distance from the radar).

Radars are broadly categorized into two groups: Monostatic radars with a single antenna shared for radar Tx and Rx, and bi-static radars with separate Tx antenna and Rx antenna. Selection of a mono-static vs. bi-static radar can depend on the implementation choice, but is also a function of the operating frequency band. For example, for mmWave radar (i.e., a radar operating in the mmWave frequency band), there can be a large overlap between the transmitted radar waveform and the received reflections, especially for target object in close proximity of the radar, a phenomenon referred to as "leakage" or self-interference. In such cases, selection of separate Tx and Rx antennas appears to be crucial for radar operation.

Various kinds of sensing/sounding waveform can be used for radar operation. Generally, a single-carrier sinusoidal waveform in the form of A(t) sin[2πf(t)+φ(t)] is used for radar sounding, that is generated by a local oscillator (LO). Various kinds of sensing/sounding waveform can be used for radar operation. Generally, a single-carrier sinusoidal waveform in the form of A(t) sin [2πf(t)+φ(t)] is used for radar sounding, that is generated by a local oscillator (LO). Herein, A(t) and f(t) and φ(t) are amplitude, frequency, and phase of the sensing/sounding waveform, all of which can be time-varying based on the waveform design, as discussed next.

Two most notable categories for radar waveforms include: pulse sounding waveform (accordingly, a pulse radar) and continuous-wave sounding waveform (accordingly, a continuous-wave radar). A pulse sounding waveform has an "on/off" or "pulse" shape, wherein the radar transmits a sounding waveform for a period of time and then switches to the "silent/listen" mode for another (extended) period of time wherein the radar does not transmit. During the radar transmission or "on" time period of a pulse radar, the UE still transmits a sinusoidal waveform, but most/all radar detection procedures are based on the pulse shape including the on/off time periods. In principle, a pulse waveform can be considered as amplitude modulation (AM) of the sinusoidal waveform based on a pulse shape. On the other hand, a continuous-wave (CW) radar continuously transmits a radar waveform without any on/off time pattern. For a CW radar, other waveform parameter such as frequency (frequency modulation or "FM") or phase (phase modulation or "PM") can be used, leading to FMCW radar or PMCW radar (a.k.a., phase code modulation (PCM) radar), respectively. Other modulation types include polarization modulation, noise (random) function modulation, and so on.

Accordingly, a pulse radar is more suitable for a monostatic radar architecture (although it can be used equally well for bi-static radar architecture), and a CW radar can be only used for bi-static radar architecture since a CW radar needs to continuously transmit a sounding waveform and receive the corresponding reflections.

For the case of pulse radar, the radar transmits a periodic, high-power, short "pulse", wherein the amplitude A(t) is a square-wave signal shape with a logical "one" for a short time and zero otherwise (during waiting mode). Once the radar transmission period is completed, the radar goes to silent/listen mode for a long time window (e.g., with a length T>>pulse duration), during which the radar samples the received signals at the Rx antenna to determine reflection or echoes of the target(s). Accordingly, the radar determines the distance/range 'R' to the target object based on the two-way time difference 't' until observing an Rx pulse (i.e., the reflection of the Tx pulse from the object received at the radar) using the formula R=(c·t)/2, wherein 'c' is the speed of light.

For uninterrupted operation of radar and tracking of the target's location, the pulse radar keeps transmitting/repeating the pulse shape with a periodicity. The time ΔT between two radar Tx pulses is known as the pulse repetition interval (PRI), and is also referred to as the "slow" time scale of the radar operation. Accordingly, a pulse repetition frequency (PRF) is defined as F_s=1/ΔT. For correct operation of the pulse radar, it is essential that reflections of a Tx pulse associated with a target are received before the next Tx pulse transmission, otherwise the target's range will be wrongly determined by the pules radar. Therefore, a target range is unambiguously detected if the target distance/range to the pulse radar is less than c/(2F_s). The parameter c/(2F_s) is referred to as the maximum unambiguous range interval for the pulse radar, and is one of the key metrics for pulse radar performance. For example, for a pulse radar with PRF of F_s=10 mega-Hertz (MHz), the range resolution is around 15 meters (m).

In addition, it is possible to perform time diversity techniques for radar detection, referred to as "pulse integration", wherein reflections of a same target corresponding to multiple Tx pulses are coherently combined to increase the SINR for target detection.

To determine the target's location/range with a given resolution/granularity and also to determine the target's velocity/speed, the radar samples the signals received at the Rx antenna during the Rx time window to detect reflections/echoes from target(s). The resolution or granularity of range detection by the pulse radar is based on how fast the radar can sample during the Rx window. Accordingly, the time Δt between two samples is known as the sampling period, and is also referred to as the "fast" time scale. Accordingly, the pulse radar's sampling rate is defined as f_s=1/Δt. The pulse radar can achieve a range sampling resolution of c/(2f_s), i.e., the radar is able to determine UE's range to belong to a "range bin" of size c/(2f_s). Based on the PRI or PRF parameters described earlier for the "slow" time scale, the radar can define such range bins until a max range of c/(2F_s). For example, for a pulse radar with sampling rate of f_s=1 GHz, the range resolution is around 15 cm.

For determination of target's speed/velocity, it is noted that target's motion with a speed of v m/second (sec) leads to a Doppler frequency change given by the formula f_d=(v/c)f_c, where f_c is the carrier frequency of the Tx pulse. For such determination, it is common in radar technology to record Rx samples in a two-dimensional grid, wherein a horizontal axis corresponds to the slow-time or pulse index, and the vertical axis corresponds to fast-time or range bin index. Then, the pulse radar can determine the corresponding Doppler frequency change for a target in a given range bin by applying discrete Fourier transform (DFT) (or fast Fourier transform, "FFT") to the horizontal axis for each range bin, so that a new two-dimensional grid is formed, where the vertical axis still corresponds to fast-time or range bin index, but the horizontal axis now corresponds to the frequency domain or "Doppler bins". The pulse radar then determines the target's velocity based on the detected Doppler bin.

It is noted that in the case of a MIMO radar (as described next), such two-dimensional grids are extended to a three-dimensional grid/cube, where the third dimension corresponds to the antenna index or alternatively target's angular information.

To determine target's spatial information such as target's angle (or elevation) compared to the radar, the radar can use multiple antenna operation. A MIMO radar can use the antenna array steering vector to generate beams towards different directions or angles. The radar can determine the target's angle based on the angle of arrive (AoA) of the Rx beam with highest received power. The angular resolution is based on the size of FFT spatial bins.

A continuous-wave radar (CW radar) continuously generates a high frequency signal, and continuously receives and processes a flow of incoming Rx signals from the reflections coming back to the receiver. Without modulation, a CW radar can correctly determine the speed of moving targets using frequency shift caused by Doppler. However, there will not be a time reference to enable a determination of the range of the target. A modulated CW radar can facilitate range determination as well, since it provides time references in the transmitted/received signals to be able to determine extra information such as range.

A frequency modulated continuous wave (FMCW) radar, which is very common for vehicular applications, is based on a voltage controlled oscillator (VCO) that produces a chirp with a frequency change of bandwidth B in a period Tp. The chirp can be a linear or quadratic chirp, such as an up-chirp only, or a linear-triangular frequency chirp with an up-chirp and a down-chirp.

A phase modulated continuous wave (PMCW) radar uses a sequence of bits to perform binary phase modulation on a continuous wave, so that a '0' is mapped to a 0-degree phase shift and a '1' is mapped to a 180-degree phase shift (i.e., a binary phase shift key or "BPSK" operation). In principle, a PMCW radar is similar to a pulse radar, but with sequences (a.k.a., "codes") instead of pulses. Therefore, the sequence of phase shifts depends on the use of certain sequences with special properties, such as auto-correlation properties. Various sequences can be considered for a PMCW such as complementary Golay sequences, M-sequences, Barker sequence, and Almost Perfect Auto-Correlation Sequences (APAS), and so on. In addition to high range resolution with low energy consumption and low implementation complexity, a benefit of PMCW is that the sequence can be consider as an identity (ID), so that the radar can operate with very good interference robustness, identification, and security.

Radar received and detection performance is based on the detection algorithm used at the radar receiver processor. A common method for radar detection is to use a matched filter that correlates the radar's transmitted sounding waveform with the received reflection waveforms. Accordingly, most radar detections method involve comparison of the matched filter output with a threshold. Therefore, radar's detection performance is crucially based on the choice of the threshold. This leads to a statistical detection problem that is associated with a false alarm probability and a miss detection probability. In radar theory and practice, the Neumann-Pearson criterion is generally accepted as a method to maximize the SINR. According to this criterion, the false alarm probability is fixed at the acceptable level, F, and under this condition, the maximum detection probability, D, is estimated. The choice of the false alarm is based on the radar's knowledge of statistical information on wanted signals/targets, unwanted interference and/or environment background reflections (a.k.a., clutter), and receiver noise. In various scenarios, such statistical information may be only partially available or may be changing over time (e.g., due to change in the environment background/clutter). Therefore, robust and adaptive algorithms, such as constant false alarm rate (CFAR) detection methods, are widely used for radar detection and recognition that "learn" the clutter information over time and ensure a guaranteed performance regardless of the (changing) environment situation.

Throughout this disclosure, the term "communication" is used in a broad sense of sending/receiving/exchange of data/information or corresponding control/signaling, and can include transmission or reception of any DL or UL or SL channel or signal for one UE or a group of UEs.

Throughout this disclosure, the term "sensing" or "radar sensing" or "radar" is used in a broad sense of usage of electromagnetic waveforms, such as radio-frequency (RF) waveforms, to identify presence of object(s) and/or to determine corresponding physical features or attributes such as location, for example, in horizontal/vertical/spatial/angular domain, or velocity/speed, acceleration, and so on.

FIG. 1 illustrates an exemplary networked system utilizing communication and sensing according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, NR, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the term "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

FIG. 2 illustrates an exemplary base station (BS) utilizing communication and sensing according to various embodiments of this disclosure. The embodiment of the BS 200 illustrated in FIG. 2 is for illustration only, and the BSs 101, 102 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280a-280n, multiple radio frequency (RF) transceivers 282a-282n, transmit (TX or Tx) processing circuitry 284, and receive (RX or Rx) processing circuitry 286. The BS 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 200 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 200 could include multiple instances of each (such as one per RF transceiver). Also, various components in FIG. 2 could be combined, further subdivided, or omitted and additional components could be added according to particular needs.

Figure 3:
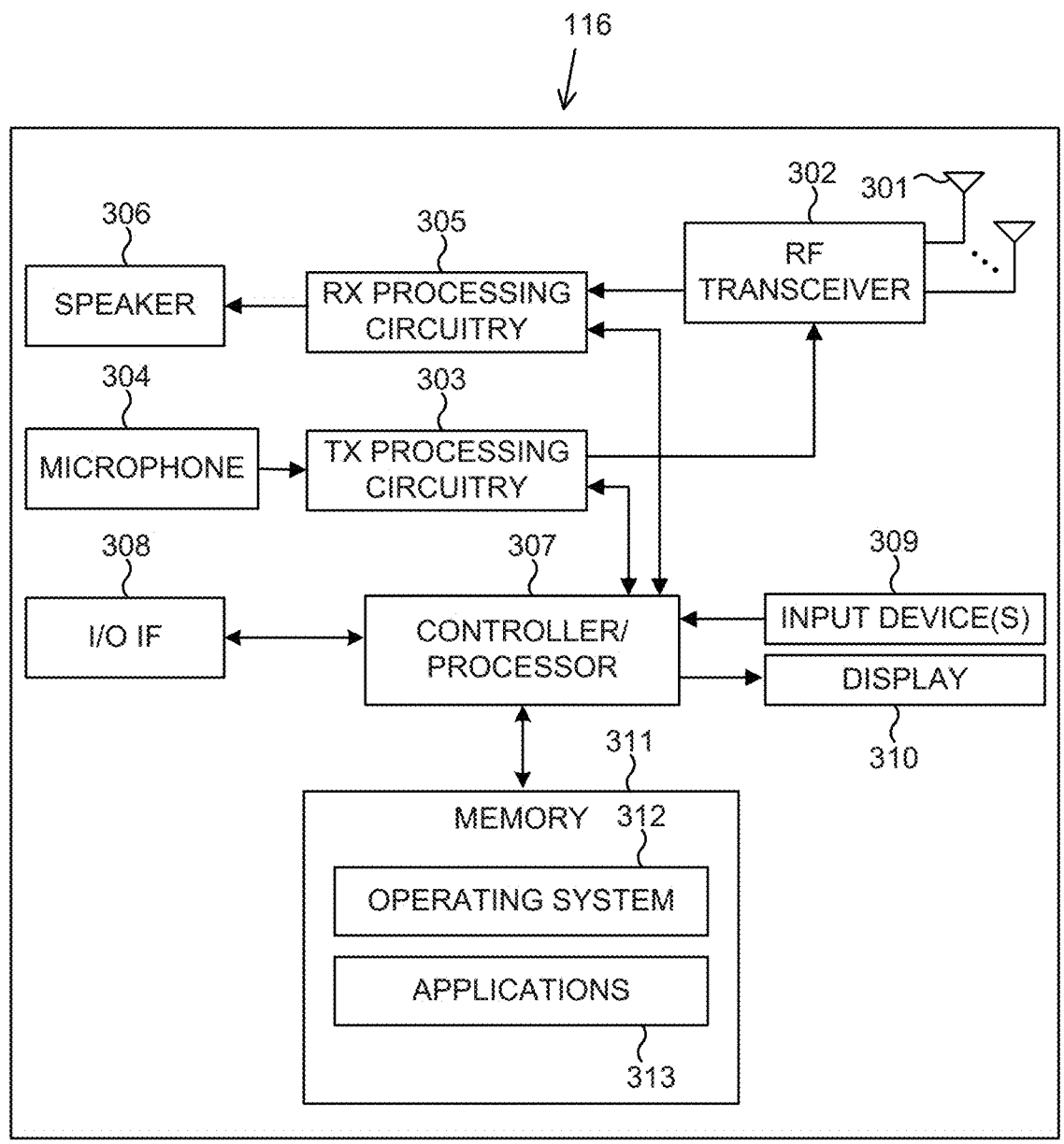
FIG. 3 illustrates an exemplary electronic device for communicating in the networked computing system utilizing communication and sensing according to various embodiments of this disclosure.

FIG. 3 illustrates an exemplary electronic device for communicating in the networked computing system utilizing communication and sensing according to various embodiments of this disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 301, a radio frequency (RF) transceiver 302, TX processing circuitry 303, a microphone 304, and receive (RX) processing circuitry 305. The UE 116 also includes a speaker 306, a controller or processor 307, an input/output (I/O) interface (IF) 308, a touchscreen display 310, and a memory 311. The memory 311 includes an OS 312 and one or more applications 313.

The RF transceiver 302 receives, from the antenna 301, an incoming RF signal transmitted by an gNB of the network 100. The RF transceiver 302 down-converts the incoming RF signal to generate an IF or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the processor 307 for further processing (such as for web browsing data).

The TX processing circuitry 303 receives analog or digital voice data from the microphone 304 or other outgoing baseband data (such as web data, e-mail, or interactive video game data) from the processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The processor 307 can include one or more processors or other processing devices and execute the OS 312 stored in the memory 311 in order to control the overall operation of the UE 116. For example, the processor 307 could control the reception of forward channel signals and the transmission of reverse channel signals by the RF transceiver 302, the RX processing circuitry 305, and the TX processing circuitry 303 in accordance with well-known principles. In some embodiments, the processor 307 includes at least one microprocessor or microcontroller.

The processor 307 is also capable of executing other processes and programs resident in the memory 311, such as processes for CSI reporting on uplink channel. The processor 307 can move data into or out of the memory 311 as required by an executing process. In some embodiments, the processor 307 is configured to execute the applications 313 based on the OS 312 or in response to signals received from gNBs or an operator. The processor 307 is also coupled to the I/O interface 309, which provides the UE 116 with the ability to connect to other devices, such as laptop computers and handheld computers. The I/O interface 309 is the communication path between these accessories and the processor 307.

The processor 307 is also coupled to the touchscreen display 310. The user of the UE 116 can use the touchscreen display 310 to enter data into the UE 116. The touchscreen display 310 may be a liquid crystal display, light emitting diode display, or other display capable of rendering text and/or at least limited graphics, such as from web sites.

The memory 311 is coupled to the processor 307. Part of the memory 311 could include RAM, and another part of the memory 311 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 307 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
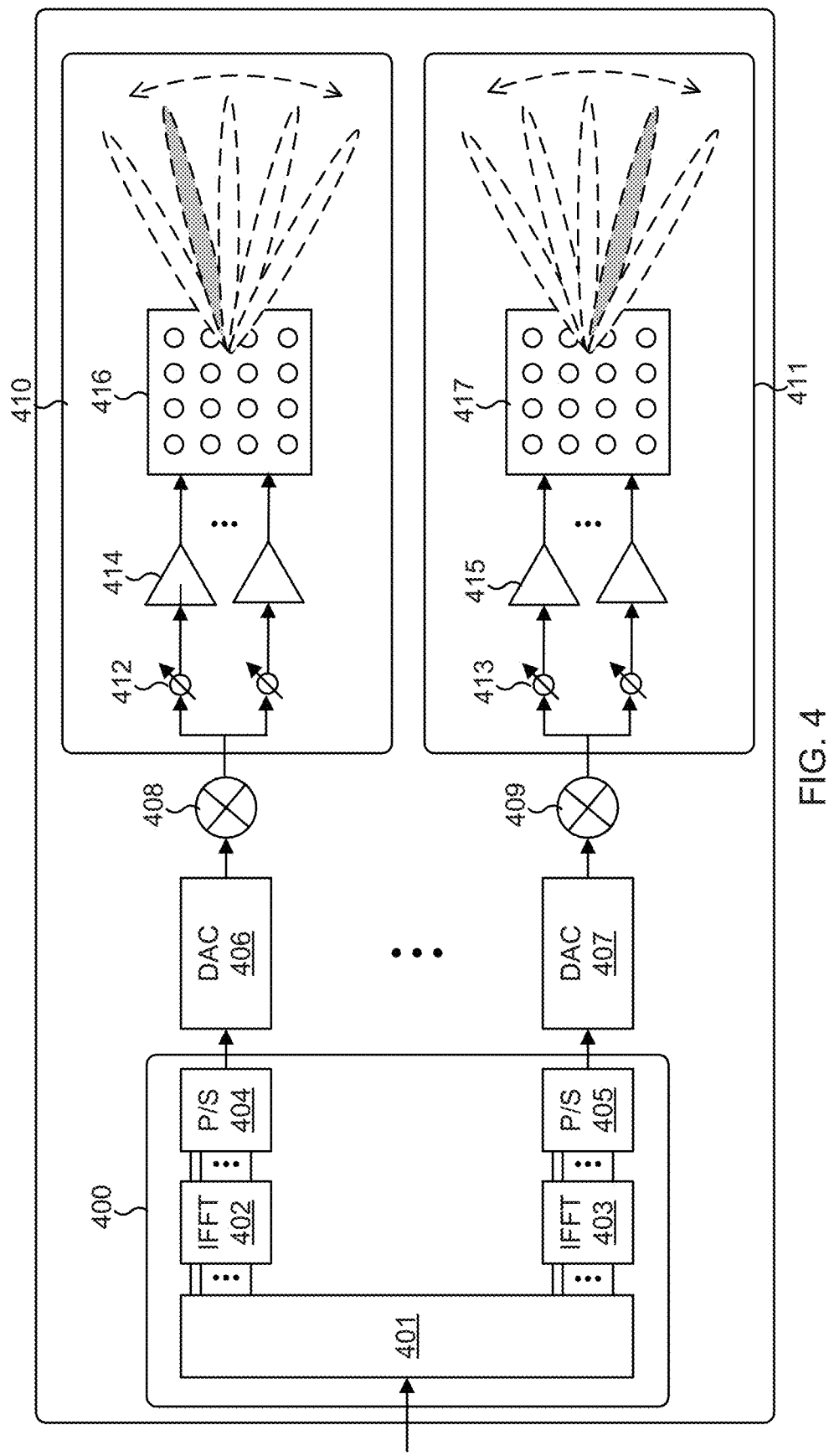
FIG. 4 illustrates, in greater detail, a portion of BS 200 of FIG. 2 or the UE 116 of FIG. 3 that is used for performing hybrid beamforming for communications.

FIG. 4 illustrates, in greater detail, a portion of BS 200 of FIG. 2 or the UE 116 of FIG. 3 that is used for performing hybrid beamforming for communications. In the example of FIG. 4, a broadband digital precoder 401 for digital beamforming 400 receives a signal to be transmitted, and provides the received signal to RF chains each including an inverse fast Fourier transform (IFFT) processor 402, 403 and a parallel-to-serial (P/S) converter 404, 405. The outputs of the RF chains are received by digital-to-analog converters (DAC) 406, 407, respectively. The outputs of DACs 406, 407 are received by mixers 408, 409, and the outputs of mixers 408, 409 are received by an analog beamformer 410, 411 that each includes: one or more phase shifters 412, 413; amplifiers 414, 415; and an antenna array 416, 417.

For an electronic device (UE) 116, the number of antenna elements within antenna array 416, 417 can be large for a given form factor. However, the number of digital and analog signal processing chains may be limited due to hardware constraints (such as the feasibility to install a large number of ADCs/DACs at mmWave frequencies) as illustrated in FIG. 4. In this case, one digital chain is mapped onto a large number of antenna elements that can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture illustrated in FIG. 4 can be applied at the base station as well as at the UE.

A BS or a UE may utilize one or multiple transmit beams to cover the whole area of one cell. The BS or UE may form a transmit beam by applying suitable gains and phase settings to an antenna array. In order to overcome higher propagation losses at higher frequencies such as the mmWave frequency, the BS or UE may form a number of transmit beams, each providing coverage over a region narrower than the overall coverage region. The BS or UE may also form receive beams to increase the signal-to-interference-and-noise ratio (SINR) at the receiver. In the downlink, the BS may form transmit beams and the UE may form receive beams while, likewise, in the uplink, the UE may form transmit beams and the BS may form receive beams.

To assist the UE in determining a preferred Rx and/or Tx beam, a beam sweeping procedure may be employed consisting of the BS transmitting a set of transmit beams to sweep the cell area and the UE measuring the signal quality on different beams using its receive beams. To facilitate candidate beam identification, beam measurement and beam quality reporting, the BS configures the UE with one or more RS resource (e.g., SS block, periodic/aperiodic/semi-persistent CSI-RS resources or CRIs) corresponding to a set of Tx beams. An RS resource refers to a reference signal transmission on a combination of one or more time (OFDM symbol)/frequency (subcarrier(s))/spatial (antenna port) domain locations. For each Rx beam, the UE reports different Tx beams received using that Rx beam, ranked in order of signal strength (RSRP) and optionally CSI (CQI/PMI/RI). Based on the UE's measurement report feedback, the BS indicates, to the UE, one or more transmission configuration indicator (TCI) states for reception of PDCCH and/or PDSCH.

Figure 5:
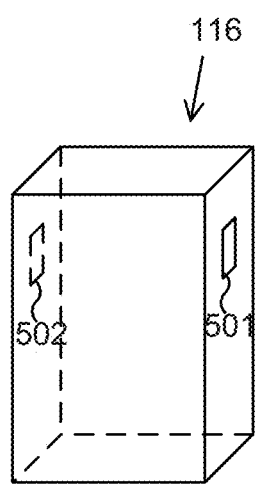
FIG. 5 is a diagrammatic view of the UE 116 of FIG. 3.

FIG. 5 is a diagrammatic view of the UE 116 of FIG. 3. A 5G terminal or UE can be equipped with multiple antenna elements. There can also be more than one antenna module 501, 502 fitted on the terminal, where each module can have one or more antenna elements. Beamforming is an important factor when UE tries to establish a connection with a BS station. FIG. 5 shows UE 116 equipped with two mmWave antenna modules or panels 501, 502 at the left and the right edges of the UE 116. A beam management procedure is implemented at the UE 116 to maintain the best antenna module, as well as the corresponding best beam of that antenna module, for signal reception and transmission by the UE 116. The UE may also use multiple antenna modules simultaneously, in which case the beam management procedure can determine the best beam of each antenna module for signal reception and transmission by the UE.

Figure 6:
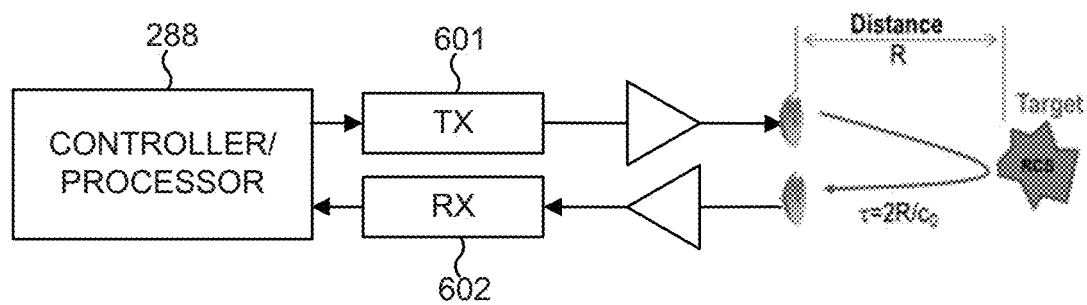
FIG. 6 illustrates, in greater detail, a portion of the UE 116 of FIG. 3 that is used for sensing.

FIG. 6 illustrates, in greater detail, a portion of the UE 116 of FIG. 3 that is used for sensing. The UE 116 can also be equipped with radar modules, which can operate at mmWave frequency. A common type of radar is the "monostatic" radar, in which the transmitter 601 of the radar signal and the receiver 602 for detecting its delayed echo are, together with their respective antennas, substantially in the same location. FIG. 6 shows the high level architecture for the common monostatic radar, i.e., the transmitter and receiver are co-located (e.g., using a common antenna) or nearly co-located (using separate but adjacent antennas). Monostatic radars are generally assumed coherent, i.e., the transmitter and receiver are synchronized via a common time reference.

The radar can be used to detect the range, velocity and/or angle of a target. Operating at mmWave frequency with GHz of bandwidth (e.g., 2, 3, 5 or 7 GHz bandwidth), the radar can be useful for applications such as proximity sensing, gesture recognition, liveness detection, mmWave blockage detection, and so on.

FIGS. 7A, 7B, 7C, and 7D diagrammatically illustrate separate antenna panels and a common antenna panel for wireless communication and radar in the UE 116 of FIG. 3. Independent operations of communication and radar on a UE may not be possible when the RF isolation between the wireless communication and radar is not sufficiently good. The radar transmission interference to the wireless communication signal reception can depend on the radar Tx power, the radar bandwidth, the radar Tx power spectral density, and the wireless communication system bandwidth that is interfered by the radar transmission. For directional radar and/or wireless communication beams, the radar interference level to the wireless communication DL reception can also be a function of the operating beams. Under this condition, simultaneous communication reception (transmission) and radar transmission (reception) may not be feasible due to the interference between the two systems.

Figure 7A:
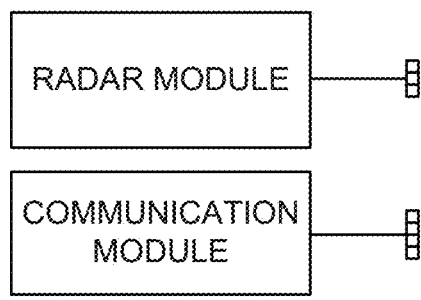
FIGS. 7A, 7B, 7C, and 7D diagrammatically illustrate, respectively, separate antenna panels and a common antenna panel for wireless communication and radar in the UE 116 of FIG. 3.
Figure 7B:
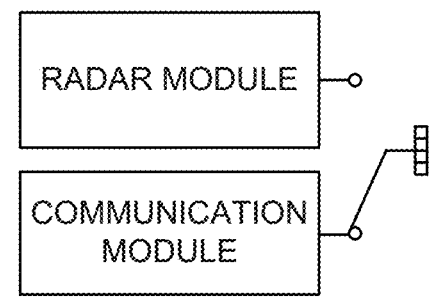
Figure 7C:
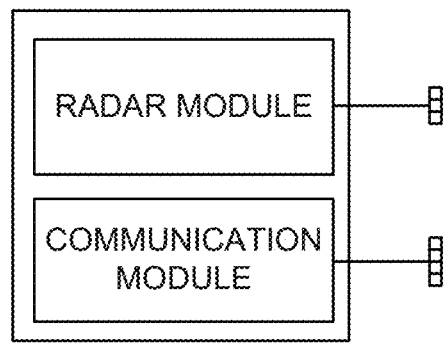
Figure 7D:
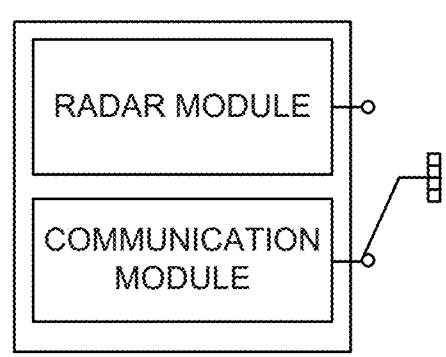

FIGS. 7A and 7B show two possible architectures of UE with a wireless communication module and a radar module that may suffer from the inter-system interference problem due to the lack of RF isolation between the two systems. FIG. 7A illustrates an architecture with separate antenna panels/modules for the wireless communication module and the radar module, in which interference in the internal circuit and RF interference over the air may occur. FIG. 7B illustrates an architecture with a common antenna panel/module, in which interference within the switch may occur due to imperfect isolation. FIGS. 7C and 7D illustrate similar architectures for wireless communication and radar modules, but also depict the two modules being provided in a single housing, device, or functional unit.

E-1) Resource Allocation in Time and Frequency for Communication and Sensing:

In one embodiment, the UE can be configured or indicated with various time/frequency resource allocation methods for communication and sensing.

In a first approach, separate resources can be allocated for radar sensing compared to resources for communication. In one example, separate resource can refer to non-overlapping or fully orthogonal resource allocation between radar sensing and communications. For example, in the time domain, resources for radar transmission can be TDM with respect to resources for communication. In another example, in the frequency domain, resources for radar transmission can be FDM with respect to resources for communication. In another example, separate resources can refer to overlapping, but not identical resources. For example, frequency resources can partially or fully overlap between sensing and communication, but time resources are completely separate. In another example, time resources can partially or fully overlap between sensing and communication, but frequency resources are completely separate. In one example, separate or overlapping resources can apply to only sensing transmission or only sensing reception or both.

In one example, the UE can be configured with a time pattern, wherein a first set of symbols/slots/subframes/frames in the time pattern are configured for radar sensing, and a second set of symbols/slots/subframes/frames in the time pattern are configured for communication, wherein the first set and the second set do not overlap. For example, the radar resources can be referred to as "R" (for radar) or as "S" (for sensing), while the communication resources can be referred to as "C" (for communication) or as "D" or "L" (for downlink or uplink) or possibly "SL" (for sidelink), and so on.

The time pattern can be referred to as a slot format, or a communication-radar slot format, or a communication-radar time pattern. Such time pattern(s) can have a structure. For example, the time pattern can include a first number of slots for radar followed by a second number of slots for communication. In another example, the time pattern can include a first number of slots and a second number of symbols for radar followed by a third number of slots and a fourth number of symbols for communication. In yet another example, the time pattern can include a number of guard symbols or slots between radar resources and communication resources, e.g., to accommodate a switching time between the radar module and the communication module. In one example, a set of resources/symbols/slots/subframes/frames for radar can be further split between radar transmission (radar Tx) and radar reception (radar Rx), where, as in one option, such split can be left to UE implementation. In one example, time-domain resources are configured only for radar Tx but not for radar Rx (or only for radar Rx, but not for radar Tx). Similarly, a set of resources/symbols/slots/subframes/frames for communication can be further split between downlink (DL or D) reception, and uplink (UL or U) transmission, and/or possibly sidelink (SL) communication, and so on. A time pattern can be associated with a periodicity, so that a same pattern is repeated after a previous pattern ends. In one example, system specification can provide a number of such time patterns, and higher layer signaling such as SIB (e.g., a new SIB or extension or modification of an existing SIB) or RRC (e.g., common/cell-specific RRC or dedicated/UE-specific RRC) can configure one of the time patterns to the UE. In another example, multiple time patterns can be configured to the UE. For example, the UE can be configured with two time patterns, with separate configuration for periodicity and other parameter as described earlier, so that a second time pattern is applied after a first pattern ends, then the first pattern is applied, then the second pattern, and so on. In one example, L1/L2 signaling, such as MAC CE or DCI, can indicate a time pattern or two/multiple time patterns. For example, a DCI filed or format can indicate a time pattern, wherein the DCI format can be in a UE-specific search space (USS) set or a common search space (CSS) set, including a group-common DCI format for a number of UEs, possibly with each UE reading a configured position in the DCI format.

Figure 8:
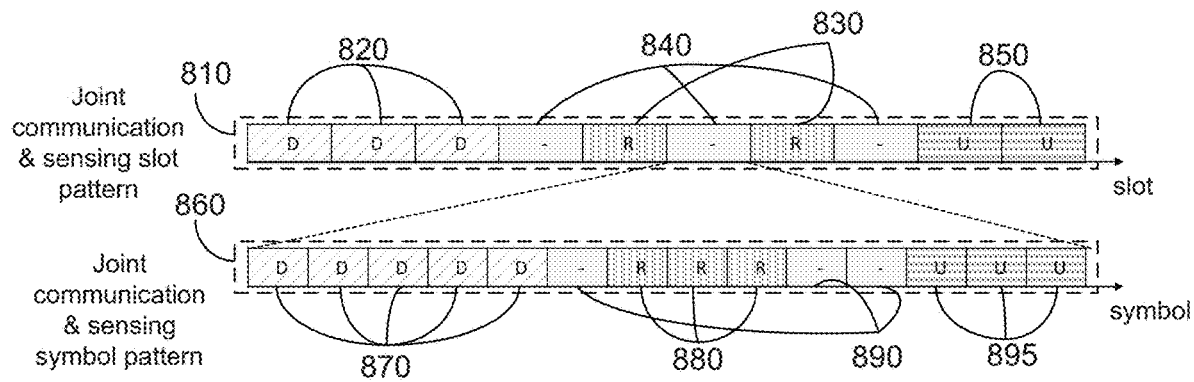
FIG. 8 shows an example time pattern for joint communication and sensing according to embodiments of the present disclosure.

FIG. 8 shows an example time pattern for joint communication and sensing according to embodiments of the present disclosure, where some slots/symbols are allocated to DL/UL communications and some slots/symbols are allocated for radar sensing. For example, a joint communication and sensing slot pattern 810 can be considered that includes a number of downlink slots (D) 820, a number of radar slots (R) 830, a number of flexible slots ('-') 840, and a number of uplink slots (U) 850. Each flexible slot 840, in turn, can have a joint communication and sensing symbol pattern 860 that includes a number of downlink symbols (D) 870, a number of radar symbols (R) 880, a number of flexible symbols ('-') 890, and a number of uplink symbols (U) 895.

Figure 9:
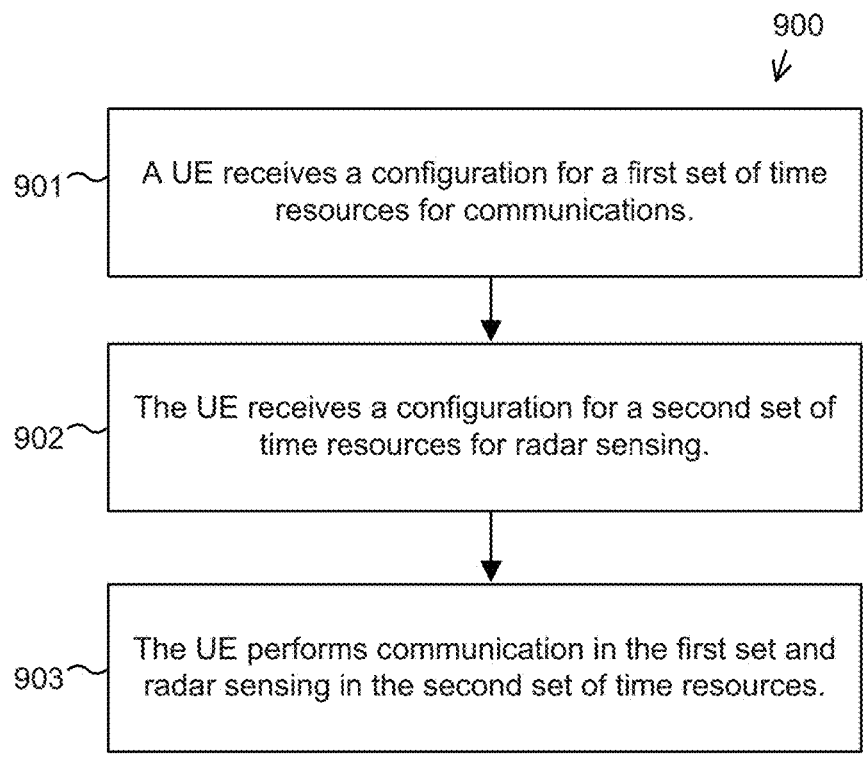
FIG. 9 shows an example flowchart for configuration of a time pattern with time resources for communication and sensing according to embodiments of the present disclosure.

FIG. 9 shows an example flowchart for configuration of a time pattern with time resources for communication and sensing according to embodiments of the present disclosure. In the process 900, a UE receives a configuration for a first set of time resources for communications (step 901). The UE receives a configuration for a second set of time resources for radar sensing (step 902). The UE performs communication in the first set and radar sensing in the second set of time resources (step 903).

In step 901, the communication can be for example for DL/UL/SL. The time resource in steps 901 and 902 includes but need not be limited to slot/symbol/subframe/frame index and periodicity. It can be also indicated using bitmap of a certain size for slot/symbol/subframe/frame level indication of sensing and communication time pattern. In step 902, as one example, resources for radar sensing, i.e., the second set can be configured in such a way that those resources do not overlap with the first set configures in step 901. The UE performs communication in the first set and radar sensing in the second set of time resources in step 903.

In another example, an existing slot pattern for communication, such as a TDD DL/UL configuration, can be re-used for indication or determination of time-domain resources for radar sensing. For example, the UE can be provided with "reserved" resources in a TDD DL/UL configuration, and the UE uses such reserved resources for radar sensing transmissions (and/or possibly radar sensing receptions). One example of such reserved resources can be symbols/slots that are indicated as "flexible" (F or '-') by both a higher-layer signaling TDD configuration and a DCI format including a slot format indication (SFI) such as a DCI format 2_0. In another example, the UE can be configured with a parameter and/or rule to determine time-domain resources for radar sensing with respect to a configured TDD DL/UL pattern. For example, a subset of time-domain resources for uplink (U) can be determined for radar sensing transmission, e.g., based on a parameter for subset selection, such as a periodicity and/or offset value to select a subset of uplink symbols/slots/resources. A similar approach can be used for selection of a subset for downlink (D) symbols/slots/resources for radar sensing reception.

Figure 10:
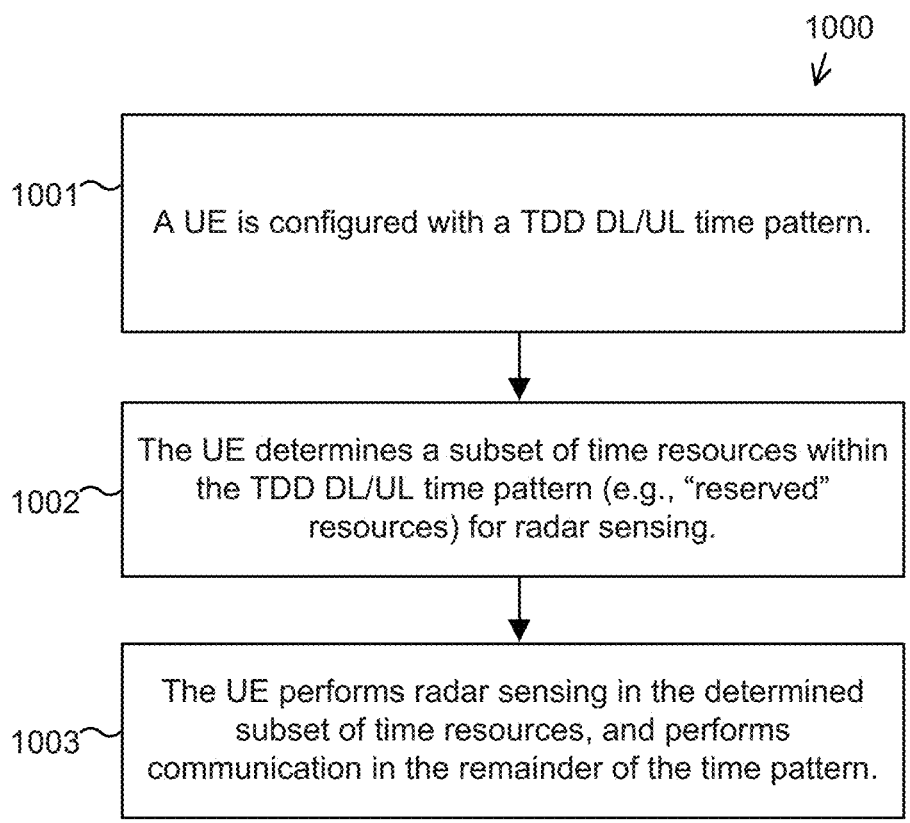
FIG. 10 shows an example flowchart for performing radar sensing in reserved resources determined from a TDD DL/UL time pattern according to embodiments of the present disclosure.

FIG. 10 shows an example flowchart for performing radar sensing in reserved resources determined from a TDD DL/UL time pattern according to embodiments of the present disclosure. In this embodiment, a UE will identify by itself the time domain opportunity for sensing from the configured TDD time pattern, even though not specifically indicated by the network on which slot to use for sensing.

A UE is configured with a TDD DL/UL time pattern in step 1001. The UE determines a subset of time resources within the TDD DL/UL time pattern (e.g., "reserved" resources) for radar sensing in step 1002. The UE performs radar sensing in the determined subset of time resources, and performs communication in the remainder of the time pattern (i.e., in the received time pattern except for the determined subset of time resources) in step 1003.

In one example, a numerology for slots/symbols associated with radar sensing transmission/reception is same as a numerology for slots/symbols associated with DL/UL/SL communication. In another example, they can have different numerologies. Herein, numerology can refer to a sub-carrier spacing and/or cyclic prefix duration for OFDM signal generation. The embodiments herein are not limited to OFDM systems only. The same notion can be applied to any future 6G system based on different waveform technology.

In one example, time-domain resources for sensing can be same as or separate from any measurement gap(s) that is determined/configured for the UE in order to operate outside an active BWP or outside a serving cell, such as for RRM/RLM measurements from neighbor cell or CSI acquisition outside an active BWP, or for antenna switching or carrier switching, and so on.

In one example, the UE can be configured with a set of resources in the frequency domain for radar sensing. For example, the UE can be configured with an absolute frequency location, such as an RB index, to represent the start of a set of frequency resources for radar sensing, along with a value, such as a number of RBs, to represent a size of the set of frequency resources for radar sensing. In one example, frequency resources for sensing can be in same units or in different units compared to frequency resources for communications. For example, frequency resources for sensing can be in absolute units of frequency (such as Hz, MHz, GHz, and so on), or in terms of subcarriers (SCs), resource elements (REs), resource blocks (RBs), resource block groups (RBGs), or in units of sub-bands or wide-bands, based on a predetermined/configured size for such units.

In one example, frequency domain resources for sensing can be within channel carrier frequency(s) configured as serving cell(s) for communication. For example, frequency resources for sensing can include resources from one serving cell or multiple serving cells, including "channel bonding"/carrier aggregation methods wherein multiple component carries (CCs), or subsets thereof, are configured for sensing. Such multiple CCs can include intra-band contiguous CCs, or intra-band non-contiguous CCs, or inter-band CCs. In one example, the UE can be configured/indicated to perform sensing in frequency resources corresponding to a deactivated serving cell.

In another example, when a UE operates with one or multiple configured bandwidth parts (BWPs) in a serving cell from which one (or multiple) are active BWPs, the UE can be configured with sensing frequency resource that are fully within the active BWP(s), or are partially or completely outside the active BWP(s). In one example, the UE can be configured with a set of one or multiple "sensing BWP(s)", which may be same or separate from DL/UL/SL BWP(s). For example, the UE can be indicated for an active sensing BWP which is same or different from an active DL/UL/SL BWP. In one example, the UE may be configured/indicated to perform sensing in a dormant BWP.

In a further another example, frequency domain resources for sensing can be partially or totally separate from channel carrier frequency(s) configured as serving cell(s) for communication.

Figure 11:
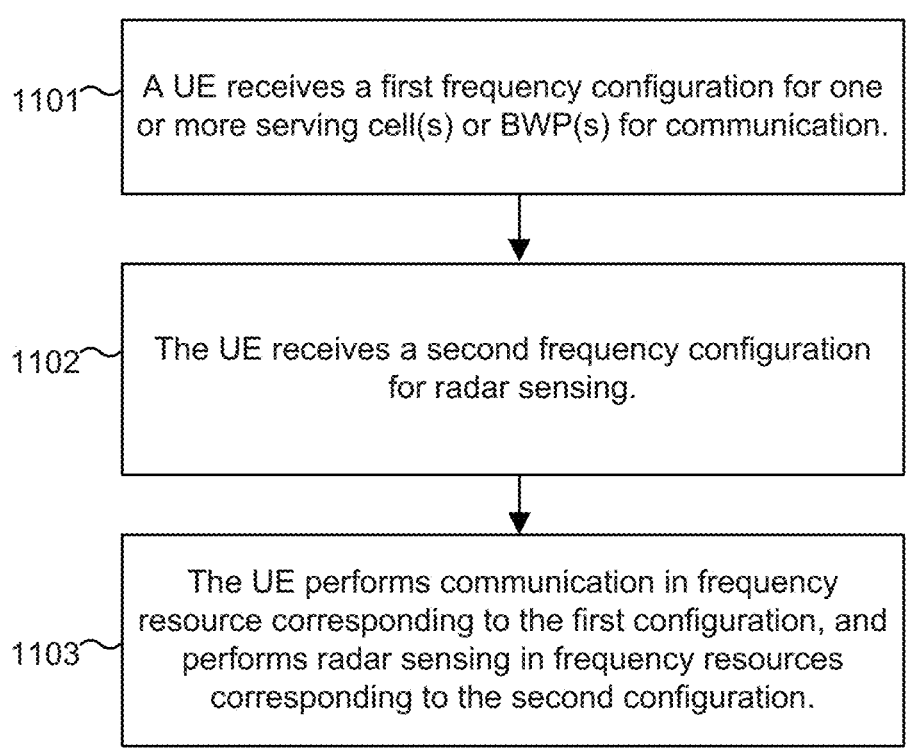
FIG. 11 shows an example flowchart for performing radar sensing according to embodiments of the present disclosure.

FIG. 11 shows an example flowchart for performing radar sensing according to embodiments of the present disclosure, in frequency resources that can have partial/full overlap with the UE's communication frequency resources in the configured serving cell(s)/active BWP(s), and/or can possibly include frequency resources outside the serving cell(s)/active BWP(s).

A UE receives a first frequency configuration for one or more serving cell(s) or BWP(s) for communication in step 1101. The UE receives a second frequency configuration for radar sensing in step 1102. The UE performs communication in frequency resource corresponding to the first frequency configuration, and performs radar sensing in frequency resources corresponding to the second frequency configuration in step 1103.

In one embodiment, the second frequency configuration of step 1102 can be made based on the first frequency configuration of step 1101. That is, the frequency resource for sensing can be indicated to the UE in terms of serving cell or BWP configuration made for communication in step 1101. In another example, more than one serving cell can comprise a single sensing bandwidth for applications requiring wideband sensing. In another example, the configuration of step 1102 can indicate frequency range in absolute Hz value that may or may not overlap with the configured frequency bandwidth for communication in step 1101.

In a second approach, overlapping time/frequency resources can be allocated for radar sensing and DL/UL/SL communication. For example, both time-domain and frequency-domain resources for radar sensing can be partially or fully overlapping with corresponding resources for communication. In one example, the UE applies spatial or angular separation between radar sensing transmission and DL/UL/SL communication transmission/reception. In one example, a first beam/spatial filter/spatial angle is used for sensing transmission/reception, and a second beam/spatial filter/spatial angle is used for communication. For example, there is a signaling or information exchange interface between the sensing module and the communication module to coordinate on selection of different beams for communication and sensing. In another example, the UE is equipped with a first antenna panel/arrays for communication Tx, such as UL/SL transmission, and a second separate antenna panel/array for radar sensing transmission, so two different beams can be generated by the UE at the same time or in overlapping time resources. In yet another example, the UE is equipped with a same antenna panel/array for both communication transmissions and radar sensing transmissions, but the corresponding transmissions occur in non-overlapping time or frequency resources. In a further example, the UE is equipped with a first antenna array for communication Rx, such as DL/SL receptions, and with a second separate antenna array/panel for radar sensing receptions. According to this example, the first or the second antenna array/panel can be same as or different from antenna panel(s)/array(s) for communication Tx or radar sensing Tx.

In one example, certain frequency resource and transmitted signal can have a dual purpose of communication and sensing. That is, as an example, the SRS/CSI-SL transmitted by UE can be detected by network or neighboring UE for channel estimation for the purpose of communication, while the UE can hear back the reflected SRS/CSI-SL signal that it transmitted for the purpose of sensing.

In one example, the UE applies (self-)interference cancellation methods to separate out transmissions/receptions corresponding to sensing from those corresponding to communications. For example, the UE detects a DL/UL/SL channel or signal, and removes that signal for (enhanced) detection of a received sensing waveform. In another example, such interference cancellation can be in multiple stages, such as a first coarse sensing reception/detection, followed by a communication signal/channel/transport block detection and cancellation, and followed by a fine sensing detection. In yet another example, such interference cancellation can include an initial communication signal/channel/transport block detection with a higher block error rate (BLER), followed by a radar sensing detection and cancellation, followed by a final communication signal/channel/transport block detection with a lower/target BLER.

Embodiment E-1 involves resource allocation for joint scheduling that integrates sensing operations into frame structure having a time pattern with uplink (U), downlink (D), flexible ('-'), and radar (R) components defined in terms of symbols/slots/subframes/frames, which is indicated by higher layers (SIB, RRC) or by L1/L2 signaling (MAC-CE, DCI), and which reuses existing TDD DL/UL time pattern(s), e.g., with "reserved" symbols/slots for sensing and possibly different numerology for communication vs. sensing.

Wide frequency allocation may be made for high-precision sensing, with the frequency configuration for sensing indicated in absolute units (e.g., GHz) or relative to communication frequency grid (e.g., RB index, subcarrier index, RBG, etc.). Frequency resources for sensing with full/partial/no overlap with frequency resources for communication, including resources inside or outside serving cell(s)/active BWP(s)/dormant BWP(s), and including wide-band sensing across multiple bands based on carrier aggregation, with possibly non-OFDM waveform for communication and/or sensing.

Intra-UE interference handling may utilize separation of resources for UL/DL/SL communication from resources for radar sensing in at least one of time/frequency domains, e.g., TDM or FDM, spatial separation in case of overlapping time/frequency resources (e.g., communication Tx antenna panel separate from sensing Tx panel and/or communication Rx antenna panel separate from sensing Rx panel), or self-interference cancellation to separate communication from sensing (e.g., one of: first detect communication signal/channel, cancel out, then detect radar sensing signal; first detect radar sensing signal, cancel out, then detect communication signal/channel; or multi-stage detection, with refinement for communication detection or sensing detection).

E-2) UE Signaling to Request 5G/6G Base Station for Activation and Release of Resources for Sensing In one embodiment, a UE can request gNB, for the case of beyond 5G system as an example, for configuration of time/frequency resources for radar sensing, and/or for activation or release of such configured resources. One motivation for such signaling between UE and gNB is because radar sensing can be a UE-side operation, whose timing may be based per UE decision or need, and unknown to the gNB. With network control, the assignment of reference signals for radar can be made optimal to not increase significant interference to the system or neighboring UEs. The coordination on the time/frequency resource for radar can also help prevent interruption of communication.

In one example, the UE sends a signaling or indication to request the gNB to configure a set of resources or to activate a set of (pre-)configured resources for radar sensing. In another example, the UE sends a signaling or indication to request the gNB to suspend or release a set of (pre-)configured resources for radar sensing. For example, at nighttime, the UE may not need any further sensing and therefore the sensing resources configured to/activated for the UE can be released (and possibly used for other UEs sensing or communication).

In one example, configuration/activation/release of time/frequency resources for radar sensing can be based on trigger conditions, timers, or counters. In one example, a UE can request for configuration/activation/release of sensing resources if the UE detects that a predefined triggering condition has occurred. For example, when the UE senses an object (such as a finger or a face or a vehicle) or a motion (such as a human gesture or vehicle speeding) with predefined characteristics, e.g., within a range threshold, or with a velocity larger than a threshold, or with a duration longer than a threshold, wherein the threshold can be predetermined or (pre-)configured.

A request for sensing resources can correspond to various sensing resource settings. For example, the UE request can correspond to time domain resources for sensing, such as a time/slot pattern for sensing and communication (as described in Embodiment E-1), or a desired periodicity (or double periodicity—as described later in Embodiment E-3) for sensing. In another example, the UE request can correspond to frequency domain resources for sensing, such as a set of RB s for sensing or a desired bandwidth for sensing. In yet another example, the UE request can correspond to sensing performance and/or complexity or UE capability, based on various configuration parameters such as a length for a sequence used for radar sensing waveform (e.g., a Zadoff-Chu "ZC" sequence, or Golay complementary sequences, and so on), or a transmission power for a radar sensing waveform/reference signal, and so on.

In one example, the UE can be configured with a number of "sensing modes" or "sensing states", such as "idle/inactive/stand-by sensing" and "active sensing". For example, a UE in "active sensing" mode/state can be configured/activated with a fine/full sensing resources, e.g., with larger bandwidth and smaller periodicity. On the other hand, a UE in "idle/inactive/stand-by sensing" mode/state can be configured/activated with a coarse sensing resources, e.g., with smaller bandwidth and larger periodicity. A transition between different modes can be based on occurrence of a triggering condition as described above, or based on UE implementation, or based on gNB decision/signaling. For example, the UE can operate with a coarse sensing resource (or resource set), and once it detects an object/motion, the UE can request and received configuration/activation for a fine sensing resource (or resource set).

In one example, a UE request for configuration/activation of radar sensing resources based on the target application for sensing. For example, there can be a predetermined/(pre-)configured set of "sensing categories" defined with respect to various sensing parameters, including:
- target or maximum sensing range/velocity/elevation/angle/field of view and so on, such as short range radar (SRR) or mid-range radar (MRR) or long range radar (LRR), each with a corresponding max/target range, or
- target or minimum resolution/granularity for sensing range/velocity/elevation/angle/field of view and so on, or
- target or maximum error in sensing range/velocity/elevation/angle/field of view and so on, or
- target or maximum transmission/reception power for sensing waveform or reference signal.

There can be also other parameters related to definition of sensing categories, such as minimum sensing range/velocity/elevation, or maximum resolution for sensing range/velocity, and so on.

Accordingly, the UE can indicate a request to the gNB for sensing resources by indicating of the "sensing categories" such as a category index from a set {0,1,2,3}, wherein each category index refers to a corresponding set of sensing parameters as described above, and is associated with a set of sensing resources.

Figure 12:
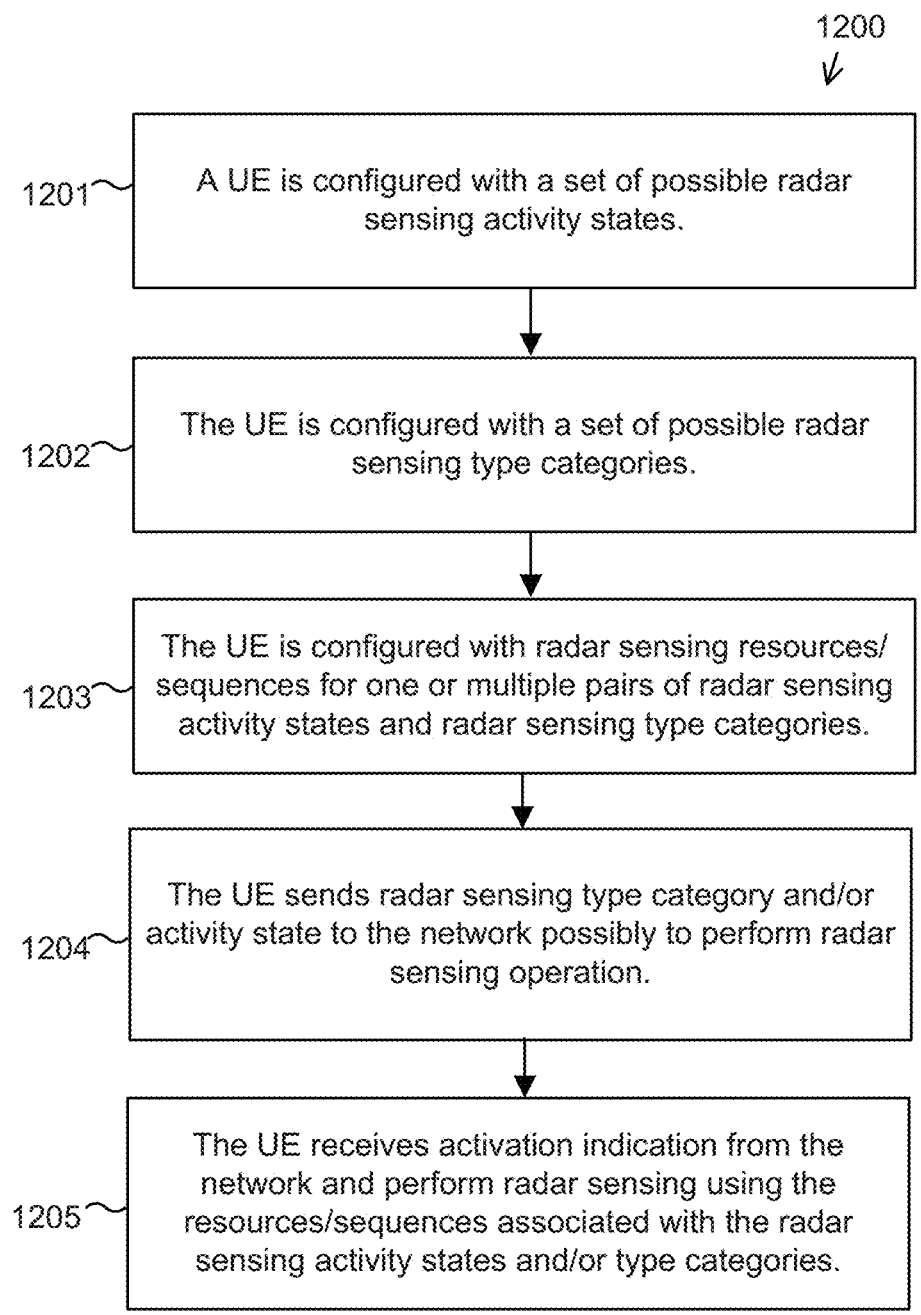
FIG. 12 shows an example flowchart for UE request for configuration/activation of radar sensing resources/sequences according to embodiments of the present disclosure.

FIG. 12 shows an example flowchart for UE request for configuration/activation of radar sensing resources/sequences according to embodiments of the present disclosure, based on a linkage of radar sensing resources/sequences with radar sensing states and radar sensing categories.

A UE is configured with a set of possible radar sensing activity states in step 1201. The UE is configured with a set of possible radar sensing type categories in step 1202. The UE is configured with radar sensing resources/sequences for one or multiple pairs of radar sensing activity states and radar sensing type categories in step 1203. The UE sends radar sensing type category and/or activity state to the network possibly to perform radar sensing operation in step 1204. The UE receives activation indication from the network and perform radar sensing using the resources/sequences associated with the radar sensing activity states and/or type categories in step 1205.

In step 1201, the radar sensing activity states can include active sensing, idle/inactive/stand-by sensing, and so on. In step 1202, the radar sensing type categories can include target/max sensing range, target/min sensing resolution for location/speed, sensing Tx power, and so on.

There can be various methods to indicate UE's request for configuration/activation/release of time/frequency resources for radar sensing. In one example, such request can be regarded as a new trigger for a random access (RA) procedure that initiates a PRACH transmission, possibly with a dedicated (contention-free) PRACH preamble, or by a contention-based PRACH preamble in a dedicated RACH occasion (RO), and so on. In another example, such a request can be regarded as a new uplink control information (UCI) or part/component of a modification to an existing UCI type that can be carried in a PUCCH resource, or can be multiplexed with a PUSCH transmission, including a (dynamic) PUSCH transmission scheduled by a DCI format, or a CG-UCI multiplexed on a configured grant (CG) PUSCH. In yet another example, such a request can be indicated by a request field such as SRS request field or CSI-RS request field in a DCI format, or a sidelink CSI-RS request in a sidelink control information (SCI) format. In such a case, a value of such request field can be mapped to a corresponding set of radar sensing resources based on a predetermined/(pre-)configured linkage. For example, a value of such request field can trigger configuration or transmission/reception of one or multiple SRS/SL CSI-RS/SL SRS resource(s) or resource set(s).

Embodiment E-2 involves UE signaling for request/activation/release of sensing resources. Since sensing is mainly a UE-side operation, whose operation timing and target performance may be based on UE decision or need not known to the gNB, the UE may request for sensing and gNB configuration/activation of sensing resources. This may be triggered by UE application, or based on triggering events, e.g., detection of an object/motion (e.g., face, gesture, vehicle) within a certain range or with a certain speed (from inactive sensing state). The UE can also request for release of sensing resources when there is no need, e.g., night/sleep time.

The procedure for UE to request radar sensing resources may involve an explicit sensing request (e.g., UE request for a certain sensing time pattern, a given sensing frequency allocation, a preferred sensing sequence length, etc.), and implicit sensing request (e.g., UE indicates a sensing "activity state" and/or a sensing "category type," that is/are linked to a configuration for sensing resources, where sensing "activity state" may include active sensing, inactive/idle/stand-by sensing, etc. and where sensing "category type" related to the sensing application and requirements, e.g., a set of sensing category types {0,1,2,3} each of which associated with a combination of: target/max/min sensing range, target/min/max sensing resolution, target/max sensing accuracy, target sensing Tx power, etc.).

Alternatively, various indication methods for a UE to request for sensing resources (for release thereof) may be implemented through one or more of: PRACH transmission with a dedicate preamble or in a dedicated RACH occasion (RO); PUCCH transmission with sensing request as a new UCI type; sensing request as UCI multiplexed on a dynamic PUSCH or as configured grant UCI (CG-UCI) on CG-PUSCH; or a new request field in UCI.

In response to UE request(s) for sensing, the network configures/activates sensing resources such that UE's communication proceeds without interruption. Network control can also ensure that radar sensing reference signals do not cause significant interference to the system or neighboring UEs by indicating to avoid strong interfering beams.

There are various interference scenarios for intra-UE and inter-UE interference between radar and communication, including:
- interference caused to a UE's radar sensing receptions by DL/UL/SL communication transmissions/receptions from the same UE or other UEs, or
- interference caused to a UE's DL/SL communication receptions by radar sensing transmissions/receptions from the same UE or other UEs, or
- interference caused to a gNB's reception of a UE's UL communication transmissions by radar sensing transmissions/receptions from the same UE or other UEs.

Specific instances of inter-UE interference may occur due to overlap of communication and sensing, for example: UL/SL communication by a first UE interfering with sensing Rx of a second UE; sensing Tx by a first UE interfering with DL/SL communication of a second UE; sensing Tx by a first UE interfering with sensing Rx of a second UE. Inter-UE interference can arise for UEs of a same cell or different cells.

In another example, inter-UE interference for communication and sensing can be caused by UEs in different cells, such as communication transmissions by UEs in a first cell can interfere with radar sensing receptions for UEs in a second (neighbor) cell, or such as radar sensing transmissions by UEs in a first cell can interfere with communication receptions for UEs in a second (neighbor) cell. In such cases, a UE can use cross-link interference (CLI) or remote interference management (RIM) methods for inter-UE interference handling.

For intra-UE interference handling, various methods for time/frequency/spatial resource configuration or sequence configuration (such as root sequence or cyclic shift, and so on), as described earlier in Embodiment E-1, can be used to ensure such transmissions/receptions are "orthogonal" for a same UE, and interference is avoided. Another option, also described earlier in Embodiment E-1, is to allow non-orthogonal resource allocation for radar and communication resources, and then rely on (self-)interference techniques at the UE to distinguish and recover communication from sensing.

There are various methods to handle inter-UE interference between radar and communication. In one example, time/frequency/spatial resource(s) and/or sequence(s) for radar sensing are configured in a UE-specific manner, so that the gNB ensures that different UEs are provided with orthogonal resources that will not cause interference. In one example, the gNB can configure non-overlapping sensing resources to UEs in a group, such as UEs in close proximity, (e.g., using graph coloring methods), and reuse those sensing resources to UEs or UE groups that are further away, without causing any/much inter-UE interference.

In another example, time/frequency/spatial/sequence configuration for radar sensing are configured in a cell-specific or BWP-specific or UE-group-specific manner, so that a "pool" of resources/sequences are shared by a number of UEs operating in a cell or BWP or belonging to a predetermined/(pre-)configured or dynamically indicated group of UEs. For example, a group of UEs can be determined based on close proximity and location/ranging of the UEs.

In such cases, a UE can perform "resource sensing" for different resources in the resource/sequence pool, and once the UE identifies that a resource is "available," the UE can use the corresponding resource/sequence for radar sensing transmission and reception. Herein, "resource sensing" for a resource/sequence refers to UE procedures that ensures few/no other UE is using the resource/sequence for radar sensing (or possibly communication) purposes and/or there is little/no interference caused by/to the UE if the UE uses the resource/sequence. Accordingly, the UE can determine whether or not there is any "activity" by other UEs corresponding to the resource/sequence. For example, "resource sensing" can include energy detection methods such as measurement of RSRP, RSSI, RSRQ, SINR, and so on, and comparing with corresponding threshold(s). In another example, "resource sensing" can include signal detection methods, such as reference signal (RS) detection or payload/TB detection. In yet another example, both methods can be used for "resource sensing," so that the UE determines whether there is any RS/TB detected and then checks the power level such as RSRP corresponding to the detected RS/TB, or vice versa.

Figure 13:
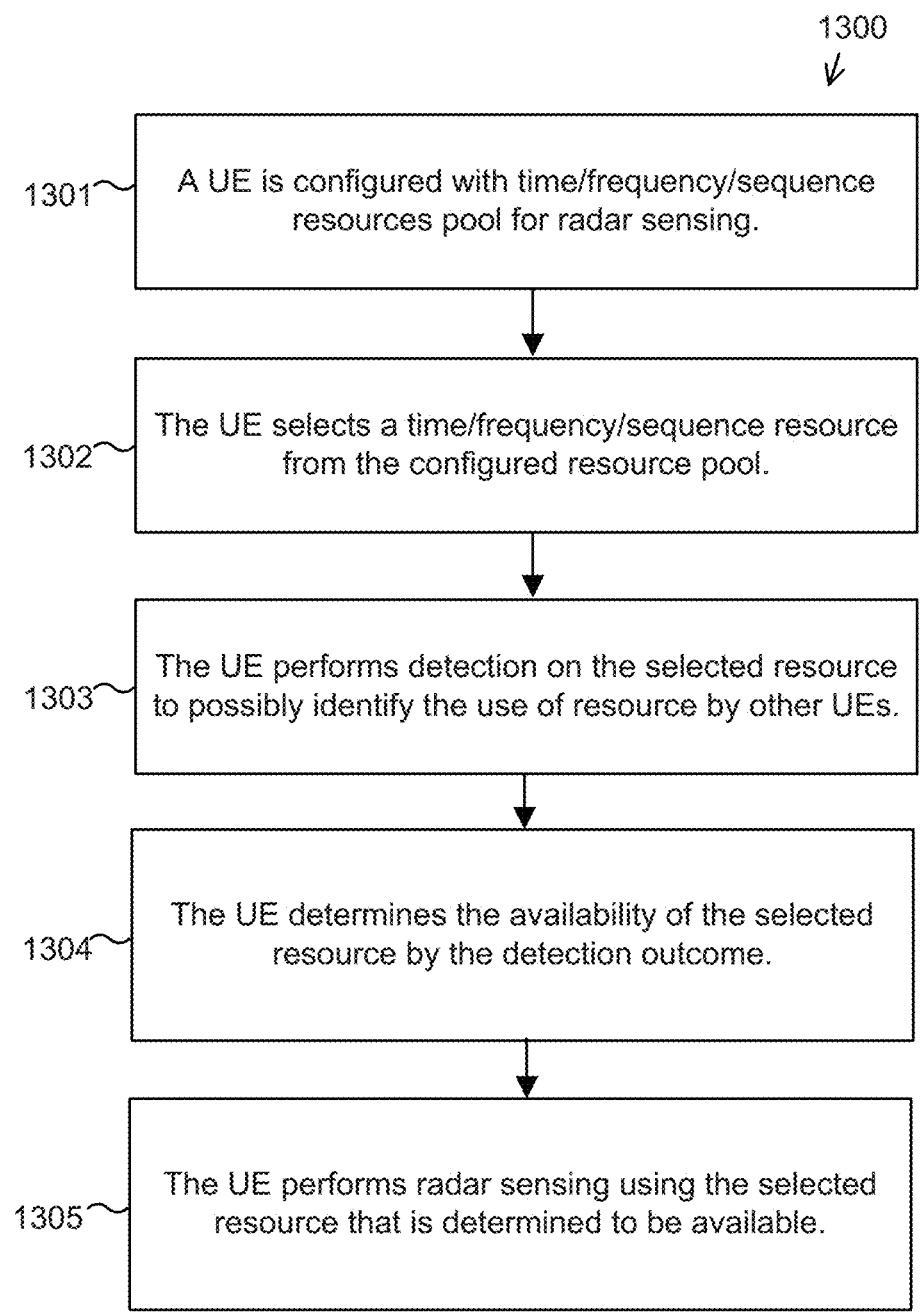
FIG. 13 shows an example flowchart for "resource sensing" for radar sensing operation according to embodiments of the present disclosure.

FIG. 13 shows an example flowchart for "resource sensing" for radar sensing operation according to embodiments of the present disclosure, where the UE needs to find an "available" resource from a resource "pool" that is shared by other UEs, based on energy/power detection or sequence/signal detection method.

A UE is configured with time/frequency/sequence resources pool for radar sensing at step 1301. The UE selects a time/frequency/sequence resource from the configured resource pool in step 1302. The UE performs detection on the selected resource to possibly identify the use of resource by other UEs at step 1303. The UE determines the availability of the selected resource by the detection outcome at step 1304. The UE performs radar sensing using the selected resource that is determined to be available at step 1305.

In step 1303, the detection can be based on energy detection or signal detection of known signal including signature, sequence, and waveform, etc. Any other detection method beyond energy/signal detection or combination of them are possible. In step 1304, as an example, the determination process can include a comparison with a fixed threshold, adaptive threshold. The determination can be AI/ML based learning process as well.

This disclosure pertains joint communication and radar sensing, wherein a UE is able to perform downlink/uplink/sidelink communication and also perform radar sensing by "sensing"/detecting environmental objects and their physical characteristics such as location/range, velocity/speed, elevation, angle, and so on. Radar sensing is achieved by sending a suitable sounding waveform and receiving and analyzing reflections or echoes of the sounding waveform. Such radar sensing operation can be used for applications and use-case such as proximity sensing, liveness detection, gesture control, face recognition, room/environment sensing, motion/presence detection, depth sensing, and so on, for various UE form factors. For some larger UE form factors, such as (driver-less) vehicles, trains, drones and so on, radar sensing can be additionally used for speed/cruise control, lane/elevation change, rear/blind spot view, parking assistance, and so on. Such radar sensing operation can be performed in various frequency bands, including mmWave/FR2 bands. In addition, with THz spectrum, ultra-high resolution sensing, such as sub-cm level resolution, and sensitive Doppler detection, such as micro-Doppler detection, can be achieved with very large bandwidth allocation, for example, on the order of several GHz or more.

The present disclosure provides designs for the support of joint communication and radar sensing. The disclosure aims for optimal signal design and processing block architecture that can be reused for both communication and sensing. In addition, sensing operation can be integrated into the frame structure and bandwidth configuration. Furthermore, a unified design can achieve coordination between BS-UE for uninterrupted communication, and UE-UE to minimize the impact of interference due to sensing.

One motivation is to support radar sensing operation in beyond 5G or in 6G, especially in higher frequency bands such as the ones above 6 GHz, mmWave, and even Tera Hz (THz) bands. In addition, the embodiments can apply to various use cases and settings, such as frequency bands below 6 GHz, eMBB, URLLC and IIoT and XR, mMTC and IoT, sidelink/V2X, operation in unlicensed/shared spectrum (NR-U), non-terrestrial networks (NTN), aerial systems such as drones, operation with reduced capability (RedCap) UEs, private or non-public networks (NPN), and so on.

The present disclosure relates to a communication system to be provided for supporting one or more of: higher data rates, lower latency, higher reliability, improved coverage, and massive connectivity, and so on. Various embodiments apply to UEs operating with other RATs and/or standards, and so forth.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method performed by a user equipment (UE), the method comprising:
   transmitting a request for allocation of radar sensing resources;
   receiving:
      first information related to a time resource for downlink (DL) communication, uplink (UL) communication, or radar sensing, wherein:
         the first information indicates a time pattern for a set of subcarriers and symbols, the time pattern including:
            one or more UL components for UL communications,
            one or more DL components for DL communications,
            one or more radar sensing components, and
            one or more flexible components that may be used for UL or DL communications or radar sensing; and
         the time pattern comprises one or more time slots or one or more symbols;
      second information related to a frequency resource for DL and UL communication or radar sensing; and
      third information related to a sequence for a radar sensing signal waveform;
   determining, based on the first and the second information, a radar sensing measurement report; and
   transmitting a channel with the radar sensing measurement report.

2. The method of claim 1, wherein:
   the second information indicates an allocation of frequencies,
   at least some of frequency resources allocated for radar sensing are different from frequencies for UL or DL communications, and
   others of the frequency resources allocated for radar sensing overlap with frequency resources allocated for UL or DL communications with one of a full overlap, a partial overlap, or no overlap.

3. The method of claim 1, wherein:
   the request for allocation of radar sensing resources is an explicit sensing request for one or more of a sensing time, a sensing frequency allocation, or a sensing sequence length, or
   an implicit sensing request indicated by one of a sensing activity state or a sensing category type linked to a configuration for sensing resources.

4. The method of claim 1, wherein the request for allocation of radar sensing resources is an implicit sensing request indicated by one of a sensing activity state or a sensing category type linked to a configuration for sensing resources and wherein the implicit sensing request comprises one of:
   active radar sensing by the user equipment,
   inactive, idle, or stand-by sensing by the user equipment, or
   execution by the UE of a sensing application having requirements for one or more of:
      a target sensing range, a maximum sensing range, or a minimum sensing range,
      a target sensing resolution, a maximum sensing resolution, or a minimum sensing resolution,
      a target sensing accuracy or a maximum sensing accuracy, or
      a target sensing transmission power.

5. The method of claim 1, wherein the request for allocation of radar sensing resources is included in one of:
   a physical random access channel (PRACH) transmission with a dedicated preamble,
   a PRACH transmission in a dedicated random access channel (RACH) occasion,
   a physical uplink control channel (PUCCH) transmission with uplink control information (UCI) having a type corresponding to a sensing request,
   the UCI transmitted on a dynamic physical uplink shared channel (PUSCH),
   the UCI transmitted as a configured grant UCI (CG-UCI) on a configured grant PUSCH (CG-PUSCH), or
   a request field in a UCI corresponding to the sensing request.

6. The method of claim 1, further comprising:
   receiving an indication of a configuration a resource pool for radar sensing in time or frequency resources;
   determining available resources in the configured resource pool before performing radar sensing using the resources, wherein availability of resources in the configured resource pool is determined based on one of energy detection or signal detection; and
   performing radar sensing using the resources only upon determining that the resources are available for radar sensing.

7. A user equipment (UE), comprising:
a transceiver configured to:
    transmit a request for allocation of radar sensing resources;
    receive first information related to a time resource for downlink (DL) communication, uplink (UL) communication, or radar sensing, wherein:
        the first information indicates a time pattern for a set of subcarriers and symbols, the time pattern including:
            one or more UL components for UL communications,
            one or more DL components for DL communications,
            one or more radar sensing components, and
            one or more flexible components that may be used for UL or DL communications or radar sensing; and
        the time pattern comprises one or more time slots or one or more symbols;
    receive second information related to a frequency resource for DL and UL communication or radar sensing; and
    receive third information related to a sequence for a radar sensing signal waveform; and
a processor operably coupled to the transceiver, the processor configured to determine, based on the first and the second information, a radar sensing measurement report,
wherein the transceiver is further configured to transmit a channel with the radar sensing measurement report.

8. The UE of claim 7, wherein:
the second information indicates an allocation of frequencies,
at least some of frequency resources allocated for radar sensing are different from frequencies for UL or DL communications, and
others of the frequency resources allocated for radar sensing overlap with frequency resources allocated for UL or DL communications with one of a full overlap, a partial overlap, or no overlap.

9. The UE of claim 7, wherein:
the request for allocation of radar sensing resources is an explicit sensing request for one or more of a sensing time, a sensing frequency allocation, or a sensing sequence length, or
an implicit sensing request indicated by one of a sensing activity state or a sensing category type linked to a configuration for sensing resources.

10. The UE of claim 7, wherein the request for allocation of radar sensing resources is an implicit sensing request indicated by one of a sensing activity state or a sensing category type linked to a configuration for sensing resources and wherein the implicit sensing request comprises one of:
active radar sensing by the user equipment,
inactive, idle, or stand-by sensing by the user equipment, or
execution by the UE of a sensing application having requirements for one or more of:
    a target sensing range, a maximum sensing range, or a minimum sensing range,
    a target sensing resolution, a maximum sensing resolution, or a minimum sensing resolution,
    a target sensing accuracy or a maximum sensing accuracy, or
    a target sensing transmission power.

11. The UE of claim 7, wherein the request for allocation of radar sensing resources is included in one of:
a physical random access channel (PRACH) transmission with a dedicated preamble,
a PRACH transmission in a dedicated random access channel (RACH) occasion,
a physical uplink control channel (PUCCH) transmission with uplink control information (UCI) having a type corresponding to a sensing request,
the UCI transmitted on a dynamic physical uplink shared channel (PUSCH),
the UCI transmitted as a configured grant UCI (CG-UCI) on a configured grant PUSCH (CG-PUSCH), or
a request field in a UCI corresponding to the sensing request.

12. The UE of claim 7, wherein:
the transceiver is further configured to receive an indication of a configuration a resource pool for radar sensing in time or frequency resources; and
the processor is further configured to:
    determine available resources in the configured resource pool before performing radar sensing using the resources, wherein availability of resources in the configured resource pool is determined based on one of energy detection or signal detection; and
    performing radar sensing using the resources only upon determining that the resources are available for radar sensing.

13. A base station (BS), comprising:
a processor; and
a transceiver operably coupled to the processor, the transceiver configured to:
    receive, from a user equipment (UE), a request for allocation of radar sensing resources;
    transmit first information related to a time resource for downlink (DL) communication, uplink (UL) communication, or radar sensing, wherein:
        the first information indicates a time pattern for a set of subcarriers and symbols, the time pattern including:
            one or more UL components for UL communications,
            one or more DL components for DL communications,
            one or more radar sensing components, and
            one or more flexible components that may be used for UL or DL communications or radar sensing; and
        the time pattern comprises one or more time slots or one or more symbols;
    transmit second information related to a frequency resource for DL and UL communication or radar sensing;
    transmit third information related to a sequence for a radar sensing signal waveform; and
    receive, from the UE, a channel with a radar sensing measurement report associated with the first and the second information.

14. The BS of claim 13, wherein:
the second information indicates an allocation of frequencies,
at least some of frequency resources allocated for radar sensing are different from frequencies for UL or DL communications, and
others of the frequency resources allocated for radar sensing overlap with frequency resources allocated for UL or DL communications with one of a full overlap, a partial overlap, or no overlap.

15. The BS of claim 13, wherein:
   the request for allocation of radar sensing resources is an explicit sensing request for one or more of a sensing time, a sensing frequency allocation, or a sensing sequence length, or
   an implicit sensing request indicated by one of a sensing activity state or a sensing category type linked to a configuration for sensing resources.

16. The BS of claim 13, wherein the request for allocation of radar sensing resources is an implicit sensing request indicated by one of a sensing activity state or a sensing category type linked to a configuration for sensing resources and wherein the implicit sensing request comprises one of:
   active radar sensing by the user equipment,
   inactive, idle, or stand-by sensing by the user equipment, or
   execution by the UE of a sensing application having requirements for one or more of:
      a target sensing range, a maximum sensing range, or a minimum sensing range,
      a target sensing resolution, a maximum sensing resolution, or a minimum sensing resolution,
      a target sensing accuracy or a maximum sensing accuracy, or
      a target sensing transmission power.

17. The BS of claim 13, wherein the request for allocation of radar sensing resources is received in one of:
   a physical random access channel (PRACH) with a dedicated preamble,
   a PRACH in a dedicated random access channel (RACH) occasion,
   a physical uplink control channel (PUCCH) with uplink control information (UCI) having a type corresponding to a sensing request,
   the UCI on a dynamic physical uplink shared channel (PUSCH),
   the UCI as a configured grant UCI (CG-UCI) on a configured grant PUSCH (CG-PUSCH), or
   a request field in a UCI corresponding to the sensing request.

* * * * *